US012529113B2

(12) United States Patent
Krueger et al.

(10) Patent No.: US 12,529,113 B2
(45) Date of Patent: Jan. 20, 2026

(54) METHODS AND SYSTEMS FOR DETECTION OF PATHOGENS

(71) Applicant: Laboratory Corporation of America Holdings, Burlington, NC (US)

(72) Inventors: Brian Krueger, Burlington, NC (US); Ayla Burns, Burlington, NC (US); Kimberly Wagner, Burlington, NC (US)

(73) Assignee: Laboratory Corporation of America Holdings, Burlington, NC (US)

( * ) Notice: Subject to any disclaimer, the term of this patent is extended or adjusted under 35 U.S.C. 154(b) by 760 days.

(21) Appl. No.: 17/220,647

(22) Filed: Apr. 1, 2021

(65) Prior Publication Data

US 2021/0310083 A1 Oct. 7, 2021

Related U.S. Application Data

(60) Provisional application No. 63/058,172, filed on Jul. 29, 2020, provisional application No. 63/004,143, filed on Apr. 2, 2020.

(51) Int. Cl.
*C12Q 1/70* (2006.01)
*C12Q 1/6806* (2018.01)

(52) U.S. Cl.
CPC ............ *C12Q 1/701* (2013.01); *C12Q 1/6806* (2013.01)

(58) Field of Classification Search
None
See application file for complete search history.

(56) References Cited

U.S. PATENT DOCUMENTS

| 7,776,521 B1 | 8/2010 | Rota et al. |
| 10,689,716 B1 * | 6/2020 | Daunert ................. C12Q 1/701 |
| 2016/0108463 A1 * | 4/2016 | Fischer ................ C12Q 1/6876 |
| | | 435/6.12 |

FOREIGN PATENT DOCUMENTS

WO 2004099440 A1 11/2004

OTHER PUBLICATIONS

Emery et al., "Real-Time Reverse Transcription-Polymerase Chain Reaction Assay for SARS-associated Coronavirus," Emerging Infectious Diseases, vol. 10, No. 2: 311-316 (Year: 2004).*
Hui et al., "Reverse Transcriptase PCR Diagnostic Assay for the Coronavirus Associated with Severe Acute Respiratory Syndrome," Journal of Clinical Microbiology, vol. 42, No. 5: 1994-1999 (Year: 2004).*

(Continued)

*Primary Examiner* — M Frankco G Salvoza
(74) *Attorney, Agent, or Firm* — Kilpatrick Townsend & Stockton LLP

(57) ABSTRACT

Disclosed are methods, compositions and systems for detecting the presence or absence of a pathogen in a sample. The method may include the steps of obtaining a sample from the subject and treating the sample with heat to inactivate any pathogen present in the sample. The method may further include the step of treating the sample to concentrate any pathogen present in the sample. Also, the method may include isolate a pathogen-specific nucleic acid from the heat-inactivated sample and detecting the presence or absence of the isolated pathogen-specific nucleic acid. In certain embodiments, the methods and/or systems may be used to detect SARS-CoV-2. The method may employ real time RT-PCR to provide results in about 3 hours or less.

16 Claims, 4 Drawing Sheets

Specification includes a Sequence Listing.

(56) References Cited

OTHER PUBLICATIONS

Wu et al., "A new coronavirus associated with human respiratory disease in China," Nature, vol. 579: 265-269 (Year: 2020).*
Darnell et al., "Inactivation of the coronavirus that induces severe acute respiratory syndrome, SARS-CoV," Journal of Virological Methods 121: 85-91 (Year: 2004).*
Division of Viral Diseases, Department of Health & Human Services, "2019-Novel Coronavirus (2019-nCOV) Real-time rRT-PCR Panel Primers and Probes," found at https://stacks.cdc.gov/view/cdc/84525 (Year: 2020).*
Simmons et al., "Different host cell proteases activate the SARS-coronavirus spike-protein for cell-cell and virus-cell fusion," Virology 413: 265-274 (Year: 2011).*
Kariwa et al., "Inactivation of SARS Coronavirus by Means of Povidone-Iodine, Physical Conditions and Chemical Reagents," Dermatology 212(Suppl 1): 119-123 (Year: 2006).*
Rabenau et al., "Stability and inactivation of SARS coronavirus," Med Microbiol Immunol 194: 1-6 (Year: 2005).*
Knight et al., "Thermal inactivation of animal virus pathogens," Current Topics in Virology, vol. 11: 103-119 (Year: 2013).*
Su, S. et al., "Epidemiology, Genetic Recombination, and Pathogenesis of Coronaviruses," Trends Microbiol. 24(6):490-502 (2016).
Zhu, N. et al., "A Novel Coronavirus from Patients with Pneumonia in China, 2019," N. Engl. J. Med. 382(8):727-733 (2020).
PCT/US2021/025413, "International Preliminary Report on Patentability", Oct. 13, 2022, 7 pages.
PCT/US2021/025413, "International Search Report and Written Opinion", Jul. 6, 2021, 12 pages.
"Molecular Assays to Diagnose COVID-19: Summary Table of Available Protocols", WHO Team, Available Online at: https://www.who.int/docs/default-source/coronaviruse/whoinhouseassays.pdf?sfvrsn=de3a76aa_2&download=true, Jan. 24, 2020, 80 pages.
CA3, 177,050, "Office Action", dated Jan. 22, 2024, 4 pages.
PCT/US2021/025413, "International Preliminary Report on Patentability", dated Oct. 13, 2022, 7 pages.
PCT/US2021/025413, "International Search Report and Written Opinion", dated Jul. 6, 2021, 12 pages.
Baert, et al., "Detection of Murine Norovirus 1 by Using Plaque Assay, Transfection Assay, and Real-Time Reverse Transcription-PCR Before and After Heat Exposure", Applied and Environmental Microbiology, vol. 74, No. 2, Jan. 2008, pp. 543-546.
JP2022-559926, "Office Action", dated Mar. 31, 2025, 8 pages.
Xia, et al., "Evaluation of Coronavirus in Tears and Conjunctival Secretions of Patients with SARS-CoV-2 Infection", Journal of Medical Virology, vol. 92, No. 6, Mar. 12, 2020, pp. 589-594.
"Manual for the Detection of Pathogen 2019-nCOV Ver.2.6", Available online at: https://www.niid.go.jp/niid/images/epi/corona/2019-nCoVmanual20200217-en.pdf, Feb. 17, 2020, 16 pages.
CA3177050, "Office Action", Oct. 6, 2025, 6 pages.
Corman, et al., "Detection of 2019 Novel Coronavirus (2019-nCOV) by Real-Time RT-PCR", Eurosurveillance, vol. 25, No. 3, Jan. 23, 2020, 8 pages.
Sabiiti, et al., "Heat Inactivation Renders Sputum Safe and Preserves Mycobacterium Tuberculosis RNA for Downstream Molecular Tests", Journal of Clinical Microbiology, vol. 57, No. 4, Apr. 2019, 8 pages.

* cited by examiner

SEQUENCE LISTING

<160> NUMBER OF SEQ ID NOS: 12

<210> SEQ ID NO 1
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 1
gaccccaaaa tcagcgaaat                                              20

<210> SEQ ID NO 2
<211> LENGTH: 24
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 2
tctggttact gccagttgaa tctg                                         24

<210> SEQ ID NO 3
<211> LENGTH: 24
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 3
accccgcatt acgtttggtg gacc                                         24

<210> SEQ ID NO 4
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 4
ttacaaacat tggccgcaaa                                              20

<210> SEQ ID NO 5
<211> LENGTH: 18
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 5
gcgcgacatt ccgaagaa                                                18

<210> SEQ ID NO 6
<211> LENGTH: 23
<212> TYPE: DNA
<213> ORGANISM: Artificial Sequence
<220> FEATURE:
<223> OTHER INFORMATION: Description of Artificial Sequence: Synthetic oligonucleotide

<400> SEQUENCE: 6
acaatttgcc cccagcgctt cag                                    23

<210> SEQ ID NO 7
<211> LENGTH: 22
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 7
gggagccttg aatacaccaa aa                                     22

<210> SEQ ID NO 8
<211> LENGTH: 21
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 8
tgtagcacga ttgcagcatt g                                      21

<210> SEQ ID NO 9
<211> LENGTH: 24
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 9
aycacattgg cacccgcaat cctg                                   24

<210> SEQ ID NO 10
<211> LENGTH: 19
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 10
agatttggac ctgcgagcg                                         19

<210> SEQ ID NO 11
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 11
gagcggctgt ctccacaagt                                        20

<210> SEQ ID NO 12
<211> LENGTH: 23
<212> TYPE: DNA
<213> ORGANISM: Artificial Sequence
<220> FEATURE:
<223> OTHER INFORMATION: Description of Artificial Sequence: Synthetic
      oligonucleotide

```
<400> SEQUENCE: 12
ttctgacctg aaggctctgc gcg                                                    23
```

METHODS AND SYSTEMS FOR DETECTION OF PATHOGENS

RELATED APPLICATIONS

This application claims priority to U.S. provisional patent application No. 63/004,143 filed Apr. 2, 2020, and U.S. provisional patent application No. 63/058,172 filed Jul. 29, 2020. The disclosures of U.S. provisional patent application Nos. 63/004,143 and 63/058,172 are incorporated by reference in their entireties herein.

SEQUENCE LISTING

The instant application contains a Sequence Listing which has been submitted electronically in ASCII format and is hereby incorporated by reference in its entirety. Said ASCII copy, created on Mar. 30, 2021, is named 057618-1235022_SL.txt and is 3,124 bytes in size.

FIELD

Disclosed are methods, compositions and systems related to testing for pathogens, including viral pathogens such as SARS-CoV-2 and variants thereof.

BACKGROUND

SARS-CoV-2 is an enveloped, single-stranded RNA virus of the family Coronaviridae, genus Beta coronavirus. All coronaviruses share similarities in the organization and expression of their genome, which encodes 16 nonstructural proteins and the 4 structural proteins: spike(S), envelope (E), membrane (M), and nucleocapsid (N). Viruses of this family are of zoonotic origin. They cause disease with symptoms ranging from those of a mild common cold to more severe ones such as the Severe Acute Respiratory Syndrome (SARS), Middle East Respiratory Syndrome (MERS) and Coronavirus Disease 2019 (CoVID-19). Other coronaviruses known to infect people include 229E, NL63, OC43 and HKU1. The latter are ubiquitous and infection typically causes common cold or flu-like symptoms (Su S, Wong G, Shi W, et al., Epidemiology, Genetic Recombination, and Pathogenesis of Coronaviruses, Trends Microbiol 2016; 24 (6): 490-502; Zhu N, Zhang D, Wang W, et al., A Novel Coronavirus from Patients with Pneumonia in China, 2019. N Engl J Med 2020; 382 (8): 727-733).

The SARS-CoV-2 virus can cause a serious or life-threatening disease or condition, including severe respiratory illness, to humans infected by this virus. On Feb. 11, 2020, the virus tentatively named 2019-nCoV was formally designated as Severe acute respiratory syndrome coronavirus 2 (SARS-CoV-2). Also on Feb. 11, 2020, the disease caused by SARS-CoV-2 was formally designated as Coronavirus Disease 2019 (CoVID-19). On Feb. 4, 2020, the Secretary of the Department of Health and Human Services (HHS) determined that there is a public health emergency that has a significant potential to affect national security or the health and security of United States citizens living abroad, and that involves the virus that causes CoVID-19. Additionally, new variants of SARS-CoV-2 have been detected. Thus, there is a need for the development of methods and systems for the detection of pathogens such as SARS-CoV-2 and variants thereof.

SUMMARY

Disclosed are systems and methods for detection of pathogens such as SARS-CoV-2 and variants thereof. The methods and systems may be embodied in a variety of ways.

In certain embodiments, the method may comprise a method to detect the presence or absence of a pathogen in a sample from a subject comprising: obtaining a sample from the subject; treating the sample to inactivate any pathogen present in the sample; optionally, treating the sample to concentrate any pathogen present in the sample; treating the heat-inactivated and optionally concentrated sample to isolate a pathogen-specific nucleic acid from the sample; and detecting the presence or absence of the isolated pathogen-specific nucleic acid. In certain embodiments, the sample may be heated to inactivate the pathogen. Additionally and/or alternatively, a protease may be added to the sample to inactivate the pathogen.

In an embodiment, the pathogen is SARS-CoV-2. For example, in certain embodiments, the method may comprise a method to detect SARS-CoV-2 in a sample from a subject comprising: obtaining a sample from the subject; isolating SARS-CoV-2 RNA from the sample; optionally, treating the sample to inactivate the virus; generating copy DNA (cDNA) from the SARS-CoV-2 RNA; amplifying at least one target sequence of the SARS-CoV-2 cDNA; and detecting the amplified SARS-CoV-2 sequences. In certain embodiments, the at least one target sequence of the SARS-CoV-2 comprises at least part of the nucleocapsid gene.

Also disclosed are systems for performing the methods herein. For example, the system may comprise a station or stations for performing various steps of the methods. In certain embodiments, a station may comprise a robotic station for performing the step or steps. Additionally, the system may comprise a computer-program product tangibly embodied in a non-transitory machine-readable storage medium, including instructions configured to run the system or any part of the system and/or perform a step or steps of the methods of any of the disclosed embodiments.

BRIEF DESCRIPTION OF THE DRAWINGS

The disclosed method and systems may be better understood by reference to the following non-limiting figures.

DETAILED DESCRIPTION

Figure 1:
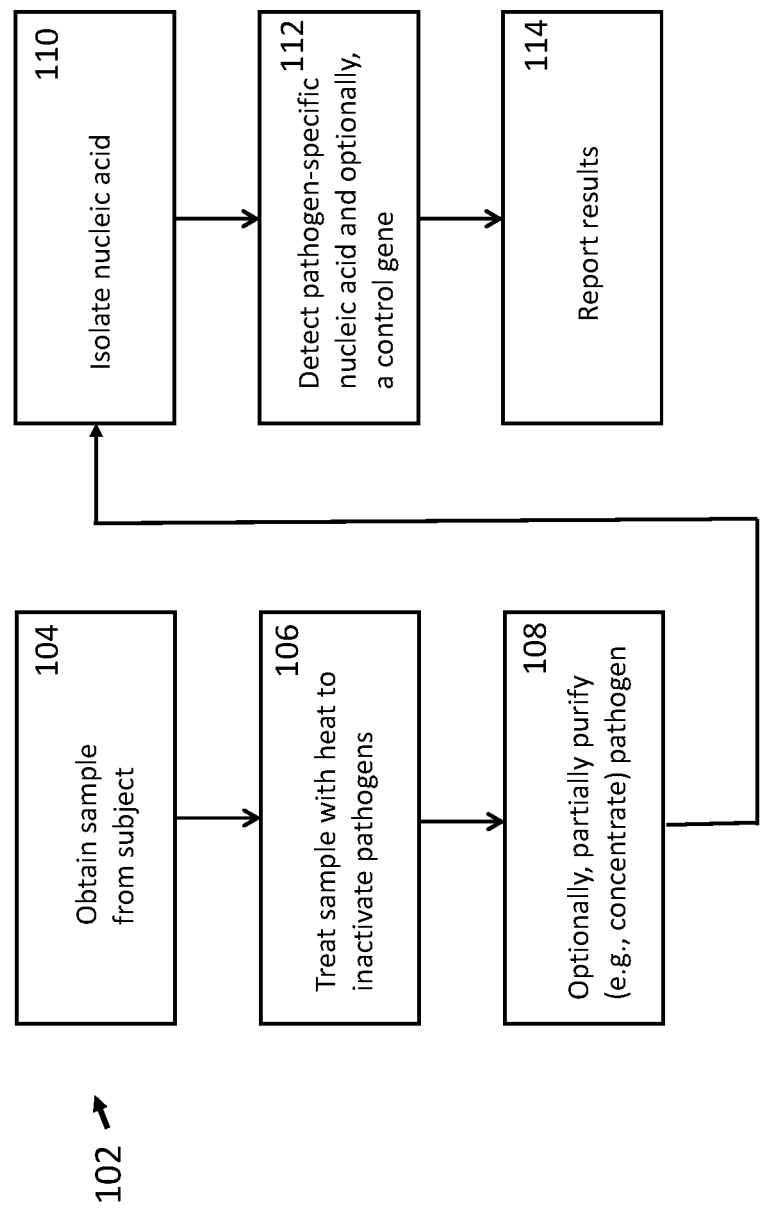
FIG. 1 shows a method for the detection of a pathogen in accordance with an embodiment of the disclosure.

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, method steps, or parts of a system, including circuits, systems, networks, processes, and other components may be shown as components in block diagram form in order not to obscure the embodiments in unnecessary detail.

Definitions

The present disclosure now will be described more fully hereinafter. The disclosure may be embodied in many different forms and should not be construed as limited to the aspects set forth herein; rather, these aspects are provided so that this disclosure will satisfy applicable legal requirements. Unless defined otherwise, all technical and scientific terms used herein have the same meaning as is commonly understood by one of ordinary skill in the art to which this disclosure belongs. All patents, applications, published applications and other publications referred to herein are incorporated by reference in their entireties. If a definition set forth in this section is contrary to or otherwise inconsistent with a definition set forth in the patents, applications, published applications and other publications that are herein incorporated by reference, the definition set forth in this section or as used elsewhere herein prevails over the definition that is incorporated herein by reference.

When introducing elements of the present disclosure or the embodiment(s) thereof, the articles "a", "an", "the" and "said" are intended to mean that there are one or more of the elements. The terms "comprising", "including" and "having" are intended to be inclusive and mean that there may be additional elements other than the listed elements. It is understood that aspects and embodiments of the disclosure described herein include "consisting" and/or "consisting essentially of" aspects and embodiments.

The term "and/or" when used in a list of two or more items, means that any one of the listed items can be employed by itself or in combination with any one or more of the listed items. For example, the expression "A and/or B" is intended to mean either or both of A and B, i.e., A alone, B alone or A and B in combination. The expression "A, B and/or C" is intended to mean A alone, B alone, C alone, A and B in combination, A and C in combination, B and C in combination or A, B, and C in combination.

Various aspects of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

As used herein, the terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 5, and 10 percent. As used herein, when an action is "based on" something, this means the action is based at least in part on at least a part of the something.

"Sample" or "patient sample" or "biological sample" or "specimen" are used interchangeably herein. Samples may include upper and lower respiratory specimens. Such specimens (samples) may include nasopharyngeal or oropharyngeal swabs, sputum, lower respiratory tract aspirates, bronchoalveolar lavage, and nasopharyngeal washes/aspirates or nasal aspirates. Other non-limiting examples of samples include, a tissue sample (e.g., biopsies), blood or a blood product (e.g., serum, plasma, or the like), cell-free DNA, urine, a liquid biopsy sample, or combinations thereof. The term "blood" encompasses whole blood, blood product or any fraction of blood, such as serum, plasma, buffy coat, or the like as conventionally defined.

As used herein, the term "subject" or "individual" refers to a human or any non-human animal. A subject or individual can be a patient, which refers to a human presenting to a medical provider for diagnosis or treatment of a disease, and in some cases, wherein the disease may be any infection by a pathogen. Also, as used herein, the terms "individual," "subject" or "patient" includes all warm-blooded animals.

As used herein, a "pathogen-specific nucleic acid" or "pathogen nucleic acid" is a nucleic acid molecule that is not normally present in the subject but is a sequence found in the pathogen genome. For example, a "SARS-CoV-2 specific nucleic acid" or "SARS-CoV nucleic acid" is not normally found in the human genome (or in samples from a human subject) but is a sequence derived from the SARS-CoV-2 genome.

As used herein "SARS-CoV-2" or the "SARS-CoV-2 virus" includes all genetic variants of the virus including those that can cause the disease of CoVID-19.

As used herein, the term "nucleic acid" refers to a polynucleotide such as deoxyribonucleic acid (DNA) or ribonucleic acid (RNA). The term is used to include single-stranded nucleic acids, double-stranded nucleic acids, mRNA, and RNA and DNA made from nucleotide or nucleoside analogues.

As used herein a "detectable moiety" is a chemical moiety that allows for molecule that is attached to be quantitatively measured. In certain embodiments, certain molecules (e.g., nucleic acid probes) used in accordance with and/or provided by the invention comprise one or more detectable entities or moieties, i.e., such molecules are "labeled" with such entities or moieties. Any of a wide variety of detectable agents can be used in the practice of the disclosure. Suitable detectable agents include, but are not limited to: various ligands, radionucleotides; fluorescent dyes; chemiluminescent agents (such as, for example, acridinum esters, stabilized dioxetanes, and the like); bioluminescent agents; spectrally resolvable inorganic fluorescent semiconductors nanocrystals (i.e., quantum dots); microparticles; metal nanoparticles (e.g., gold, silver, copper, platinum, etc.); nanoclusters; paramagnetic metal ions; enzymes; colorimetric labels (such as, for example, dyes, colloidal gold, and the like); biotin; dioxigenin; haptens; and proteins for which antisera or monoclonal antibodies are available.

In certain embodiments, a detectable moiety is a fluorescent dye. Numerous known fluorescent dyes of a wide variety of chemical structures and physical characteristics are suitable for use in the practice of the disclosure. A fluorescent detectable moiety can be stimulated by a laser with the emitted light captured by a detector. The detector can be a charge-coupled device (CCD) or a confocal microscope, which records its intensity.

Suitable fluorescent dyes include, but are not limited to, fluorescein and fluorescein dyes (e.g., fluorescein isothiocyanine or FITC, naphthofluorescein, 4',5'-dichloro-2',7'-dimethoxyfluorescein, 6-carboxyfluorescein or FAM, etc.), hexachloro-fluorescein (HEX), carbocyanine, merocyanine, styryl dyes, oxonol dyes, phycoerythrin, erythrosin, eosin, rhodamine dyes (e.g., carboxytetramethylrhodamine or TAMRA, carboxyrhodamine 6G, carboxy-X-rhodamine (ROX), lissamine rhodamine B, rhodamine 6G, rhodamine Green, rhodamine Red, tetramethylrhodamine (TMR), etc.), coumarin and coumarin dyes (e.g., methoxycoumarin, dialkylaminocoumarin, hydroxycoumarin, aminomethylcoumarin (AMCA), etc.), Q-DOTS, Oregon Green Dyes (e.g., Oregon Green 488, Oregon Green 500, Oregon Green 514., etc.), Texas Red, Texas Red-X, SPECTRUM RED, SPECTRUM GREEN, cyanine dyes (e.g., CY-3, CY-5, CY-3.5, CY5.5, etc.), ALEXA FLUOR dyes (e.g., ALEXA FLUOR 350, ALEXA FLUOR 488, ALEXA FLUOR 532, ALEXA FLUOR 546, ALEXA FLUOR 568, ALEXA FLUOR 594, ALEXA FLUOR 633, ALEXA FLUOR 660, ALEXA FLUOR 680, etc.), BODIPY dyes (e.g., BODIPY FL, BODIPY R6G, BODIPY TMR, BODIPY TR, BODIPY 530/550, BODIPY 558/568, BODIPY 564/570, BODIPY 576/589, BODIPY 581/591, BODIPY 630/650, BODIPY 650/665, etc.), IRDyes (e.g., IRD40, IRD 700, IRD 800, etc.), and the like. Favorable properties of fluorescent labeling agents include high molar absorption coefficient, high fluorescence quantum yield, and photostability. In some embodiments, labeling fluorophores exhibit absorption and emission wavelengths in the visible (i.e., between 400 and 750 nm) rather than in the ultraviolet range of the spectrum (i.e., lower than 400 nm).

A detectable moiety may include more than one chemical entity such as in fluorescent resonance energy transfer (FRET). Resonance transfer results an overall enhancement of the emission intensity. To achieve resonance energy transfer, the first fluorescent molecule (the "donor" fluor) absorbs light and transfers it through the resonance of excited electrons to the second fluorescent molecule (the "acceptor" fluor). In one approach, both the donor and acceptor dyes can be linked together and attached to the oligo primer. Donor/acceptor pairs of dyes that can be used include, for example, fluorescein/tetramethylrohdamine, IAEDANS/fluroescein, EDANS/DABCYL, fluorescein/fluorescein, BODIPY FL/BODIPY FL, and Fluorescein/QSY 7 dye. Many of these dyes also are commercially available, for instance, from Molecular Probes Inc. (Eugene, Oreg.). Suitable donor fluorophores include 6-carboxyfluorescein (FAM), tetrachloro-6-carboxyfluorescein (TET), 2'-chloro-7'-phenyl-1,4-dichloro-6-carboxyfluorescein (VIC), and the like.

Or, suitable fluorescent quencher molecules may be used. As used herein, fluorescent quenching refers to any process that decreases the fluorescence of a molecule such as black hole quenchers commercially available from Biosearch Technologies. Such quenchers include, but ar not limited to, BHQ0, BHQ1, BHQ3, and BHQ4. Different quencher dyes are suitable for use with specific fluorophores, including FAM, TET, JOE, HEX, Oregon Green®, TAMRA, ROX, Cyanine-3, Cyanine-3.5, Cyanine-5 and Cyanine-5.5 (e.g., CY-3, CY-5, CY-3.5, CY5.5, etc).

In certain embodiments, a detectable moiety is an enzyme. Examples of suitable enzymes include, but are not limited to, those used in an enzyme-linked immunosoren assay (ELISA), e.g., horseradish peroxidase, beta-galactosidase, luciferase, alkaline phosphatase, etc. Other examples include beta-glucuronidase, beta-D-glucosidase, urease, glucose oxidase, etc. An enzyme may be conjugated to a molecule using a linker group such as a carbodiimide, a diisocyanate, a glutaraldehyde, and the like.

In certain embodiments, a detectable moiety is a radioactive isotope. For example, a molecule may be isotopically-labeled (i.e., may contain one or more atoms that have been replaced by an atom having an atomic mass or mass number different from the atomic mass or mass number usually found in nature) or an isotope may be attached to the molecule. Non-limiting examples of isotopes that can be incorporated into molecules include isotopes of hydrogen, carbon, fluorine, phosphorous, copper, gallium, yttrium, technetium, indium, iodine, rhenium, thallium, bismuth, astatine, samarium, and lutetium (i.e., 3H, 13C, 14C, 18F, 19F, 32P, 35S, 64Cu, 67Cu, 67Ga, 90Y, 99mTc, 111In, 125I, 123I, 129I, 131I, 135I, 186Re, 187Re, 201T1, 212Bi, 213Bi, 211At, 153Sm, 177Lu).

Methods For Pathogen Detection

Disclosed are systems and methods for detection of pathogens such as SARS-CoV-2. The methods and systems may be embodied in a variety of ways.

In certain embodiments, the method may comprise a method to detect the presence or absence of a pathogen in a sample from a subject comprising: obtaining a sample from the subject; treating the sample to inactivate any pathogen present in the sample; optionally, treating the sample to concentrate any pathogen present in the sample; treating the heat-inactivated and optionally concentrated sample to isolate a nucleic acid from the sample; and detecting the presence or absence of the isolated pathogen-specific nucleic acid.

A variety of sample types may be used. In certain embodiments, the sample comprises a specimen from either the upper or lower respiratory system. For example, the sample may be a nasopharyngeal or oropharyngeal swab, sputum, a lower respiratory tract aspirate, a bronchoalveolar lavage, or a nasopharyngeal wash/aspirate or nasal aspirate. Or, other types of samples may be used.

In certain embodiments, the step of detecting further comprises amplification of sequences specific to the pathogen. For example, where the pathogen is a virus, detection may comprise amplification of sequences specific to the virus. In certain embodiments, where the pathogen is an RNA virus, detection may comprise generating copy DNA (cDNA) sequences specific to the virus followed by amplification e.g., by polymerase chain reaction (PCR) amplification of sequences specific to the virus. For example, the method may comprise: isolating RNA from the inactivated sample; generating copy DNA (cDNA) from the RNA isolated from the inactivated sample; amplifying at least one specific target sequence of the cDNA; and detecting presence or absence of amplified sequences.

In certain embodiments, the step of detecting further comprises amplification of a control gene that is present in the subject, but not the pathogen. For example, the control gene may be the human RNase P (RP) gene or another human gene such as a housekeeping gene involved in basic cell maintenance.

In some embodiments, the sample is heated to inactivate the pathogen. In alternate embodiments, the sample is heated to at least 60 degrees C., or to at least 65 degrees C., or to at least 70 degrees C., or to at least 75 degrees C. for a designated time. The sample may be heated for at least 10 minutes, or at least 20 minutes, or at least 30 minutes, or at least 40 minutes or at least 50 minutes or for 1 hour or more. In an embodiment, the sample may be heated at 65 degrees C. for about 30 minutes. In certain embodiments, the sample is treated with a protease to inactivate the pathogen. In an embodiment, a protease, e.g. proteinase K is also added to the samples prior to heat-inactivation. Or, another protease may be used.

In some embodiments, for the analysis of viral RNA, the step of isolating viral RNA comprises nucleic acid extraction. Additionally and/or alternatively, the samples may be subjected to methods to first concentrate the pathogen. For example, for isolation of viral particles, the samples may be subjected to concentration (e.g., purification) of the virus using a matrix designed to bind viral particles (e.g., Nanotrap® Virus Capture Kit (Ceres Nanosciences, Inc.). Using such a matrix, elution of viral RNA from the concentrated viral particles may be performed at a temperature of about 90-99 degrees C., for at least 3 minutes. In an embodiment, elution may be performed at 95 degrees C. for at least 5 minutes. The nucleic acid (e.g., RNA or DNA) may then be isolated from the sample.

Or, other methods of purification may be used. For example, nucleic acid may be isolated using a protease (e.g., proteinase K) in an extraction buffer (e.g., HEPES buffer), EDTA, and a detergent (e.g., lithium lauryl sulfate) with or without added non-pathogen DNA (e.g., salmon sperm) and incubating at about 60-65 degrees C. for about 1 hour, followed by extraction in phenol-chloroform-isoamyl alcohol and ethanol precipitation. Or, extraction in the presence of guanidinium isothiocyanate or other chaotropic agents may be performed.

In an embodiment, the pathogen is SARS-CoV-2. Thus, in certain embodiments, the method may comprise a method to detect SARS-CoV-2 in a sample from a subject comprising: obtaining a sample from the subject; isolating SARS-CoV-2 RNA from the sample; generating copy DNA (cDNA) from the SARS-CoV-2 RNA; amplifying at least one target sequence of the SARS-CoV-2 cDNA; and detecting the amplified SARS-CoV-2 sequences. In an embodiment, the at least one target sequence of the SARS-CoV-2 cDNA comprises at least part of the SARS-CoV-2 nucleocapsid (N) gene.

The method may employ quantitative reverse transcriptase (RT) PCR. For example, in certain embodiments, the step of amplifying at least one specific target sequence of the pathogen may comprise hybridizing a probe to the at least one specific target sequence such that during the extension phase of the amplification a 5'→3' nuclease activity of Taq polymerase degrades the bound probe causing a reporter dye on the probe to separate from a quencher dye on the probe during amplification and thereby generating a fluorescent signal. For detection of SARS-CoV-2, the step of amplifying at least one target sequence of SARS-CoV-2 may comprise hybridizing a probe to the at least one specific target sequence of the SARS-CoV-2 cDNA such that during the extension phase of the amplification 5' nuclease activity of Taq polymerase degrades the bound probe causing a reporter dye on the probe to separate from a quencher dye on the probe and thereby generating a fluorescent signal. A variety of reporter and/or quenching dyes known in the art may be used. In certain embodiments, the reporter dye is FAM. Additionally and/or alternatively, the quencher dye may be BHQ1. For quantitative PCR, the fluorescence intensity may then monitored throughout amplification, e.g., at each PCR cycle or at select time points.

A variety of primers and probes specific to the pathogen may be used. For example, for SARS-CoV-2, the step of amplifying at least one specific target sequence of SARS-CoV-2 comprises multiplex RT-PCR using primers and probes for the CoVID-19 N1, N2 and N3 targets and primers. In certain embodiments, the amplifying at least one specific target sequence of the SARS-CoV-2 nucleocapsid (N) gene present in the cDNA comprises the use of at least one primer and/or probe having the sequence of any one of SEQ ID NOs: 1-9 as disclosed herein.

In certain embodiments, the step of amplifying further comprises amplification of a control gene that is present in the subject, but not the virus. For example, the control gene may be the human RNase P (RP) gene or another gene such as a housekeeping gene. In certain embodiments, the primers (SEQ ID NOs: 10 and 11) and probe of SEQ ID NO: 12 are used for detection of the RP gene.

In certain embodiments, the assay is performed as a multiplex assay. For example, for detection of SARS-CoV-2, the assay may be performed with three SARS-CoV-2 primers and probes and the RP primers and probes. Thus, in certain embodiments, primers for the SARS-CoV-2 N1 gene are SEQ ID NOs: 1 and 2, and the internal probe is SEQ ID NO: 3. Also in certain embodiments, primers for the SARS-CoV-2 N2 gene are SEQ ID NOs: 4 and 5, and the internal probe is SEQ ID NO: 6. Also in certain embodiments, primers for the SARS-CoV-2 N3 gene are SEQ ID NOs: 7 and 8, and the internal probe is SEQ ID NO: 9. Also in certain embodiments, primers for the RP gene are SEQ ID NOs: 10 and 11, and the internal probe is SEQ ID NO: 12. The TaqMan® probes may be labeled at 5'-end with the reporter molecule 6-carboxyfluorescein (FAM) and with the quencher, Black Hole Quencher 1 (BHQ-1) (Biosearch Technologies, Inc., Novato, CA) at 3'-end. Variations on these primers and probes may be used to detect SARS-CoV-2 variants.

Fluorescence intensity may be monitored at each PCR cycle. The methods may be automated. For example, in certain embodiments, an Applied Biosystems QuantStudio7 Flex (QS7) instrument with software version 1.3 may be used to monitor fluorescence intensity during the PCR amplification. Or, other instruments and computer software for monitoring quantitative PCR may be used.

An embodiment of a method (102) of the disclosure is illustrated in FIG. 1. Thus, in an embodiment, a sample is obtained from a subject (104). In certain embodiments, the sample may be a nasopharyngeal or oropharyngeal swab, sputum, a lower respiratory tract aspirate, a bronchoalveolar lavage, or a nasopharyngeal wash/aspirate or nasal aspirate. Or, other types of samples may be used.

Next, the sample may be treated with heat to inactivate pathogens present in the sample (106). In alternate embodiments, the sample is heated to at least 60 degrees C., or to at least 65 degrees C., or to at least 70 degrees C. or to at least 75 degrees C. for a designated time. The sample may be heated for at least 10 minutes, or at least 20 minutes, or at least 30 minutes, or at least 40 minutes or at least 50 minutes or for 1 hour or more. In an embodiment, the sample may be heated at 65 degrees C. for about 30 minutes. In an embodiment, a protease, e.g. proteinase K or another protease, may be added to inactivate the pathogen. In certain embodiments, the protease is also added to the samples prior to addition of heat for heat-inactivation.

Also optionally, any pathogens present in the sample may be partially purified (e.g., concentrated) from the rest of the sample (108). For example, for isolation of viral particles, the samples may be subjected to concentration (e.g., purification) of the virus using a matrix designed to bind viral particles (e.g., Nanotrap® Virus Capture Kit, Ceres Nanosciences, Inc.). Or, other methods of purification may be used. Using such a matrix, elution of viral RNA from the concentrated viral particles may performed at a temperature of 90-99 degrees C. for at least 3 minutes. In an embodiment, elution may be performed at 95 degrees C. for at least 5 minutes. The nucleic acid (e.g., RNA or DNA) may then be isolated from the sample (110). At this point the presence and/or amount of pathogen-specific nucleic acid may be determined (112). In certain embodiments, where the pathogen nucleic acid is RNA, cDNA of at least a portion of the RNA may be generated.

For detection of pathogen nucleic acid, sequences specific to the pathogen may be amplified for subsequent detection. For example, in one embodiment, quantitative (i.e., real-time) PCR amplification, using primers specific to nucleic acid sequences in the pathogen and an internal probe may be used. In an embodiment, the internal probe may be labeled with a reporter and a quencher dye such that amplification allows 5'→3' exonuclease activity of Taq polymerase to release the reporter dye, thereby allowing amplification to be monitored. Any reporter and quencher dyes in the art may be used. In certain embodiments, the reporter day is FAM and the quencher dye is BHQ1. Or, other methods of detection, such as allele-specie PCR amplification, digital PCR or nucleic acid sequencing may be used. In certain embodiments, the step of detecting further comprises amplification of a control gene that is present in the subject, but not the virus (112). For example, the control gene may be the human RNase P (RP) gene or another gene such as a housekeeping gene.

At this point, results may be reported to the subject, or his or her health care provider, or other medical professional (114).

The method may be automated. For example, in an embodiment the cDNA is amplified using Applied Biosystems QuantStudio7 Flex (QS7) instrument with software version 1.3. Or, other amplification systems may be used.

Figure 2:
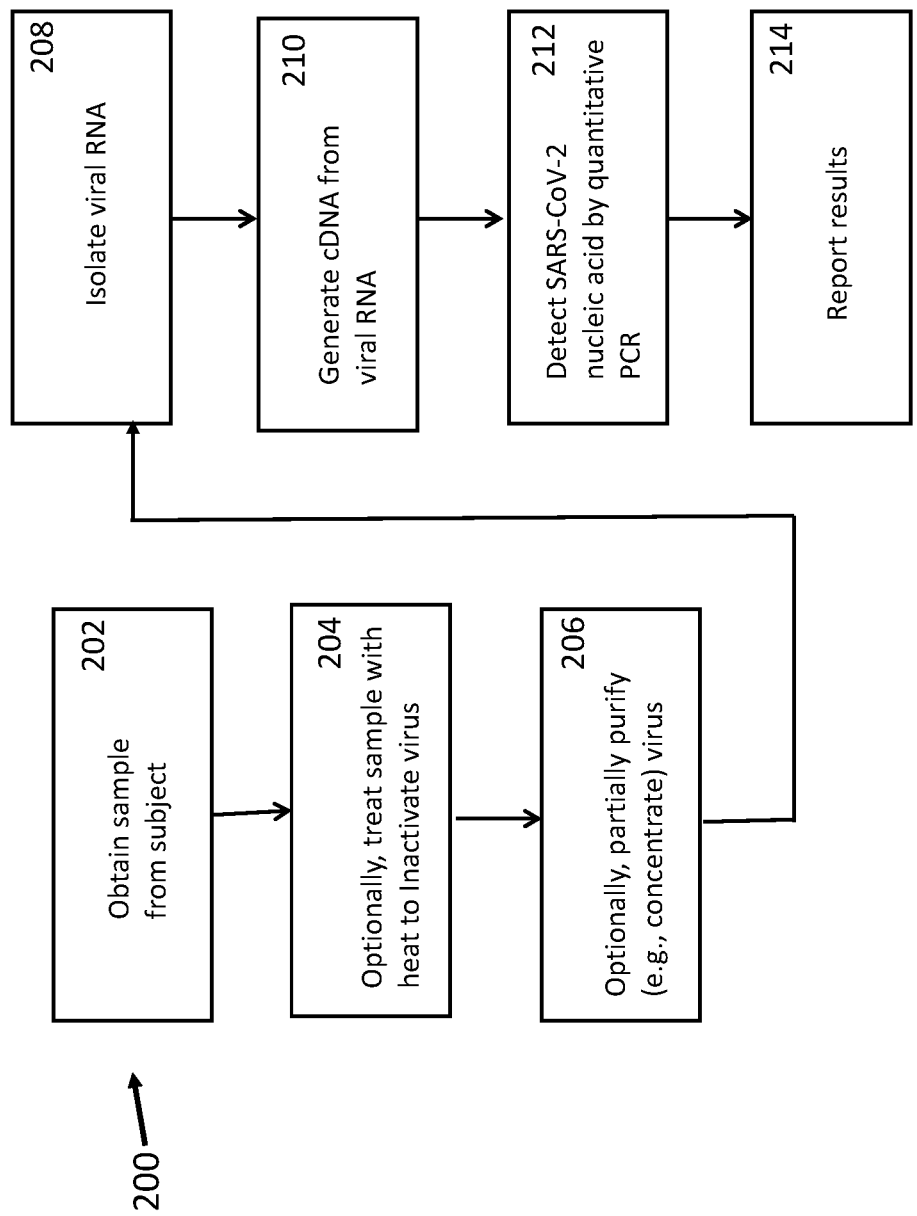
FIG. 2 shows an alternate method for the detection of SAR-CoV-2 in accordance with an embodiment of the disclosure.

An embodiment of a method of the disclosure for detection of SARS-CoV-2 (200) is shown in FIG. 2. Thus, in an embodiment, a sample is obtained from a subject (202). In certain embodiments, the sample may be a nasopharyngeal or oropharyngeal swab, sputum, a lower respiratory tract aspirate, a bronchoalveolar lavage, or a nasopharyngeal wash/aspirate or nasal aspirate. Or, other types of samples may be used.

The sample may optionally be treated with heat to inactivate SARS-CoV-2 virus present in the sample (204). In alternate embodiments, the sample is heated to at least 60 degrees C., or at least degrees 65 C, or at least 70 degrees C., or at least 75 degrees C. for a designated time. The sample may be heated for at least 10 minutes, or at least 20 minutes, or at least 30 minutes, or at least 40 minutes, or at least 50 minutes or for 1 hour or more. In an embodiment, the sample may be heated at 65 degrees C. for about 30 minutes. Thus, in an embodiment, the sample may be heated to inactivate SARS-CoV-2 virus. In an embodiment, a protease, e.g. proteinase K or another protease, is also added to inactivate the virus. The protease may be added prior to the addition of heat so as to function during heat-inactivation of the virus.

Also optionally, the SARS-CoV-2 virus present in the sample may be partially purified (e.g., concentrated) from the rest of the sample (206). For example, for isolation of viral particles, the samples may be subjected to concentration (e.g., purification) of the virus using a matrix designed to bind viral particles (e.g., Nanotrap® Virus Capture Kit, Ceres Nanosciences, Inc.). Or, other methods of purification may be used. Using such a matrix, elution of viral RNA from the concentrated viral particles may be performed at a temperature in the range of 90-99 degrees C. for at least 3 minutes. In an embodiment, elution may be performed at 95 degrees C. for at least five minutes or under similar conditions.

At this point, SARS-CoV-2 RNA may be isolated from the sample (208), and used to generate copy DNA (cDNA) (210). The cDNA may be used to determine the presence and/or amount of SARS-CoV-2 RNA sequences in the sample. For example, in one embodiment quantitative PCR amplification is used (212). The quantitative PCR may be performed by amplifying at least one specific target sequence of the SARS-CoV-2 nucleocapsid (N) gene present in the cDNA; and detecting the amplified SARS-CoV-2 nucleocapsid (N) gene sequences. In an embodiment, an internal probe that can bind to the cDNA or amplification products may be labeled with a reporter and a quencher dye such that amplification allows 5' exonuclease activity of Taq polymerase to release the reporter dye, allowing amplification to be monitored. Any reporter and quencher dyes in the art may be used. In certain embodiments, the reporter day is FAM and the quencher dye is BHQ1. In certain embodiments, primers and probes of Table 2 (SEQ ID NOs: 1-9) are used for detection of SARS-CoV-2. In certain embodiments, the step of amplifying further comprises amplification of a control gene that is present in the subject, but not the virus. For example, the control gene may be the human RNase P (RP) gene or another gene. In certain embodiments, the primers (SEQ ID NOs: 10-11) and probe of SEQ ID NO: 12 are used for detection of the RP gene. The results may be reported to the subject, or his or her health care provider, or other medical professional (214).

The methods and systems may be optimized to produce results in less than 1 day. For example, for the analysis of SARS-CoV-2 as disclosed herein, the method may take less than 10 hours, or less than 8 hours, or less than 6 hours or less than 4 hours, or less than 3 hours, or less than 2 hours, or less than one hour. Also, as noted above, in an embodiment, the samples may be subjected to viral concentration and/or heat inactivation, and/or protease treatment prior to extraction of the viral nucleic acids. In an embodiment, heat-inactivation allows for improved processing of samples and/or protects laboratory personnel. This can improve throughput, allow processing of multiple samples (e.g., 400 samples) in about 40 minutes or less. For example, in certain embodiments, the disclosed methods may be performed robotically. Robotic processing may allow for a large number of samples to be analyzed with a shorter turn-around than a completely manually performed method. In a robotic embodiment, samples may be robotically extracted from sample collection apparatus (e.g. a tube, vial, sample carrier etc.) for further analysis via any of the methods disclosed herein. In a further robotic embodiment, extracted samples may be placed in reaction vessel (e.g. tube, vial, etc.) for a PCR reaction according to any of the disclosed methods. Additionally and/or alternatively, the PCR reaction may be performed robotically.

Compositions and Kits

Also disclosed herein are compositions and/or kits for performing any of the disclosed methods or running any of the disclosed systems. In an embodiment, the compositions and/or kits comprise reagents for detecting the presence or absence of a pathogen in a sample from a subject. The composition and/or kit may comprise reagents or components for obtaining a sample from the subject, such as nasal swabs, buffer solutions, storage solutions and the like. The composition and/or kit may further comprise reagents or components for treating the sample with heat to inactivate any pathogen present in the sample. The composition and/or kit may further comprise reagents or components for treating the sample with a protease. The composition and/or kit may further comprise reagents or components for partially purifying the pathogen as discussed in detail herein. The reagents and/or components may be individually packaged. Also, the composition and/or kit may further comprise instructions for use.

The compositions and/or kit may further comprise reagents or components for detecting the presence or absence of the isolated pathogen-specific nucleic acid. For example, in some embodiments, the composition and/or kit may further comprise reagents or components for generating copy DNA (cDNA) from pathogen-specific (and/or control) RNA.

Additionally and/or alternatively, the composition and/or kit may further comprise reagents or components for quantitative PCR amplification, using primers specific to nucleic acid sequences in the pathogen and an internal probe In certain embodiments, the internal probe may be labeled with a reporter and a quencher dye such that amplification allows 5'→3' exonuclease activity of Taq polymerase release of the reporter dye to be monitored. Any reporter and quencher dyes in the art may be used. In certain embodiments, the reporter day is FAM and the quencher dye is BHQ1.

In some embodiments, and for detection of SARS-CoV-2, the composition and/or kit may further comprise reagents or components for amplifying at least one specific target sequence of the SARS-CoV-2 nucleocapsid (N) gene present in the cDNA; and detecting the amplified SARS-CoV-2 nucleocapsid (N) gene sequences.

A variety of primers and probes specific to SARS-CoV-2 may be included in the compositions and/or kits of the disclosure. In certain embodiments, the compositions and/or kit may comprise primers and/or probes for the SARS-CoV-2 N1, N2 and N3 targets. In certain embodiments, amplifying at least one specific target sequence of the SARS-CoV-2 nucleocapsid (N) gene present in the cDNA comprises the use of at least one primer and/or probe having the sequence of any one of SEQ ID NOs: 1-9 as disclosed herein. Also, in certain embodiments, the compositions and/or kit may comprise reagents (e.g., primers and probes) for amplification of a control gene that is present in the subject, but not the virus. For example, the control gene may be the human RNase P (RP) gene or another gene. For detection of RP sequences, the reagents (e.g., primers and probes) for amplification of the RP gene may comprise primers of SEQ ID NOs: 10 and 11, and a probe of SEQ ID NO: 12. In certain embodiments, the primers and/or probes are labeled with a detectable moiety such as the detectable moieties disclosed herein.

The compositions and/or kits may be used to reverse transcribe RNA to cDNA for subsequent amplification using quantitative PCR. For analysis of SARS-CoV-2, the RT-PCR may comprise a multiplex reaction with the SARS-CoV-2 primers and probes and/or primers and probes for an internal (i.e., non-SARS-CoV-2) control such as the human RP gene. Or, other combinations of primers and probes may be used for other pathogens. In certain embodiments of the disclosed compositions and/or kits, the assay is performed as a multiplex assay with three sets of SARS-CoV-2 primers and probes for the nucleocapsid gene and one set of primers and a probe for the RP gene. Thus, in certain embodiments, primers for the SARS-CoV-2 N1 gene are SEQ ID NOs: 1 and 2, and the internal probe is SEQ ID NO: 3. Also, in certain embodiments, primers for the SARS-CoV-2 N2 gene are SEQ ID NOs: 4 and 5, and the internal probe is SEQ ID NO: 6. Also, in certain embodiments, primers for the SARS-CoV-2 N3 gene are SEQ ID NOs: 7 and 8, and the internal probe is SEQ ID NO: 9. Also, in certain embodiments, primers for the RP gene are SEQ ID NOs: 10 and 11, and the internal probe is SEQ ID NO: 12. The TaqMan® probes may be labeled at 5'-end with the reporter molecule 6-carboxyfluorescein (FAM) and with the quencher, Black Hole Quencher 1 (BHQ-1) (Biosearch Technologies, Inc., Novato, CA) at the 3'-end. Or other dyes may be used. Or, the primers may be labeled with any of the detectable moieties disclosed herein for detection of amplification products without the need for an internal probe. Also, variations on these primers and probes may be used to detect SARS-CoV-2 variants.

In certain embodiments, the compositions and/or kits may include at least one of the following controls:

Internal Control—RNase P (RP) control in clinical samples. The RP primer and probe set may be included in each run to test for human RP, which controls for specimen quality and demonstrates that nucleic acid was generated by the extraction process. Or, another internal control may be used.

Positive Template Control—contains in vitro transcribed template (e.g., SARS-CoV-2) RNA with genomic regions targeted by the method. The positive control may be used to monitor for failures of rRT-PCR reagents and reaction conditions. Or, another positive template control may be used.

Negative Extraction Control (NEC)—In an embodiment, this may be a previously characterized negative patient sample. The NEC may be used as an extraction control and positive control for the internal (e.g. RP) primer and probe set.

No Template (Negative) Control—Nuclease-free, molecular-grade water may be used to monitor non-specific amplification, cross-contamination during experimental setup, and nucleic acid contamination of reagents.

Systems

Also disclosed are systems for performing the methods herein. For example, the system may comprise a station or stations for performing various steps of the methods. In certain embodiments, a station may comprise a robotic station for performing a step or steps of the method.

Figure 3:
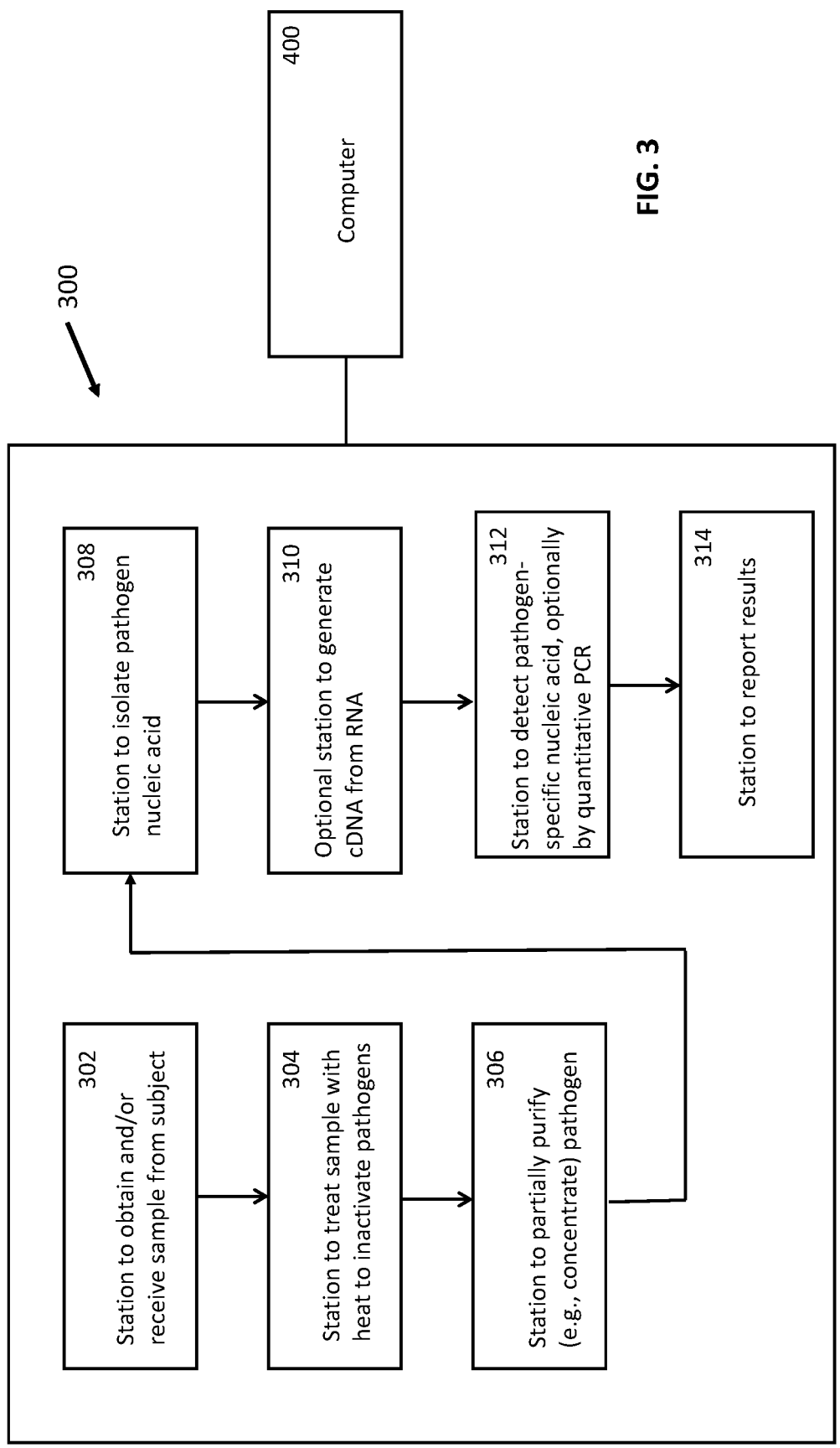
FIG. 3 shows a system for the detection of a pathogen in accordance with an embodiment of the disclosure.

FIG. 3 illustrates one embodiment of a system (300) for pathogen detection Thus, the system may comprise a station for obtaining and/or receiving a sample from a subject (302). For example, in many cases samples may be obtained from the subject (e.g., by a medical professional, care-giver or even the subject themselves) at a site remote from the testing area and sent to the testing area. The sample may be a nasopharyngeal or oropharyngeal swab, sputum, a lower respiratory tract aspirate, a bronchoalveolar lavage, or a nasopharyngeal wash/aspirate or nasal aspirate. Or, other types of samples may be used.

The system may, in certain embodiments, have a station for treating the sample to inactivate pathogens present in the sample (304). In certain embodiments, the sample is heated to inactivate the pathogen. In alternate embodiments, the sample is heated to at least 60 degrees C., or at least 65 degrees C., or at least 70 degrees C., or at least 75 degrees C. for a designated time. The sample may be heated for at least 10 minutes, or at least 20 minutes, or at least 30 minutes, or at least 40 minutes, or at least 50 minutes or for 1 hour or more. In an embodiment, the sample may be heated at 65 degrees C. for about 30 minutes. In certain embodiments, the system may have a station for adding a protease, e.g. proteinase K or another protease. This station (not shown in FIG. 3) may be prior to, after, or part of the station for heat-inactivation.

Also optionally, the system may have a station to partially purify (e.g., concentrate) any pathogens present in the sample (306). For example, for isolation of viral particles, the samples may be subjected to concentration (e.g., purification) of the virus using a matrix designed to bind viral particles (e.g., Nanotrap® Virus Capture Kit, Ceres Nanosciences, Inc.). Or, other methods of purification may be used. Using such a matrix, elution of viral RNA from the concentrated viral particles may be performed a temperature of 90-99 degrees C. for at least 3 minutes. In an embodiment, elution may be performed at 95 degrees C. for about 5 minutes.

The system may also have a station for isolating nucleic acid (e.g., RNA or DNA) from the sample (308). Where the nucleic acid is RNA, the system may have a station for generating cDNA from the RNA (310). Also, the system may have a station for determining the presence and/or amount of pathogen-specific nucleic acid in the sample (312). For example, in one embodiment quantitative PCR amplification, using primers specific to nucleic acid sequences in the pathogen and an internal probe may be used as disclosed herein. The system may also include a station to report results to the subject, or his or her health care provider, or other medical professional (314).

The disclosure contemplates that certain of the stations as illustrated may be combined as a single station. For example, and not to be limiting, the stations for RNA isolation, cDNA preparation and quantitative PCR may be combined as a single station. Or, the stations for heat-inactivation and partial purification of the pathogen may be combined. Also, as illustrated in FIG. 3, any of the stations may be automated, robotically controlled, and/or controlled at least in part by a computer (400) and/or programmable software. Thus, the system may comprise a computer-program product tangibly embodied in a non-transitory machine-readable storage medium, including instructions configured to run the system or any part of the system and/or perform a step or steps of the methods of any of the disclosed embodiments. In some embodiments, a system is provided that includes one or more data processors and a non-transitory computer readable storage medium containing instructions which, when executed on the one or more data processors, cause the one or more data processors to perform part or all of one or more methods or processes disclosed herein.

For example, disclosed is a system comprising one or more data processors, and a non-transitory computer readable storage medium containing instructions which, when executed on the one or more data processors, cause the one or more data processors to perform actions to direct at least one of the steps of obtaining a sample from the subject; treating the sample to inactivate any pathogen present in the sample; optionally, treating the sample to concentrate any pathogen present in the sample; treating the inactivated and optionally concentrated sample to isolate a pathogen-specific nucleic acid from the sample; and detecting the presence or absence of the isolated pathogen-specific nucleic acid.

Also disclosed is a computer-program product tangibly embodied in a non-transitory machine-readable storage medium, including instructions configured to run the systems and/or perform a step or steps of the methods of any of the disclosed embodiments. For example, in certain embodiments, the computer-program product tangibly embodied in a non-transitory machine-readable storage medium, includes instructions configured to cause one or more data processors to perform actions to direct at least one of the steps of obtaining a sample from the subject; treating the sample to inactivate any pathogen present in the sample; optionally, treating the sample to concentrate any pathogen present in the sample; treating the inactivated and optionally concentrated sample to isolate a pathogen-specific nucleic acid from the sample; and detecting the presence or absence of the isolated pathogen-specific nucleic acid.

The systems and computer products may perform any of the methods disclosed herein. One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Figure 4:
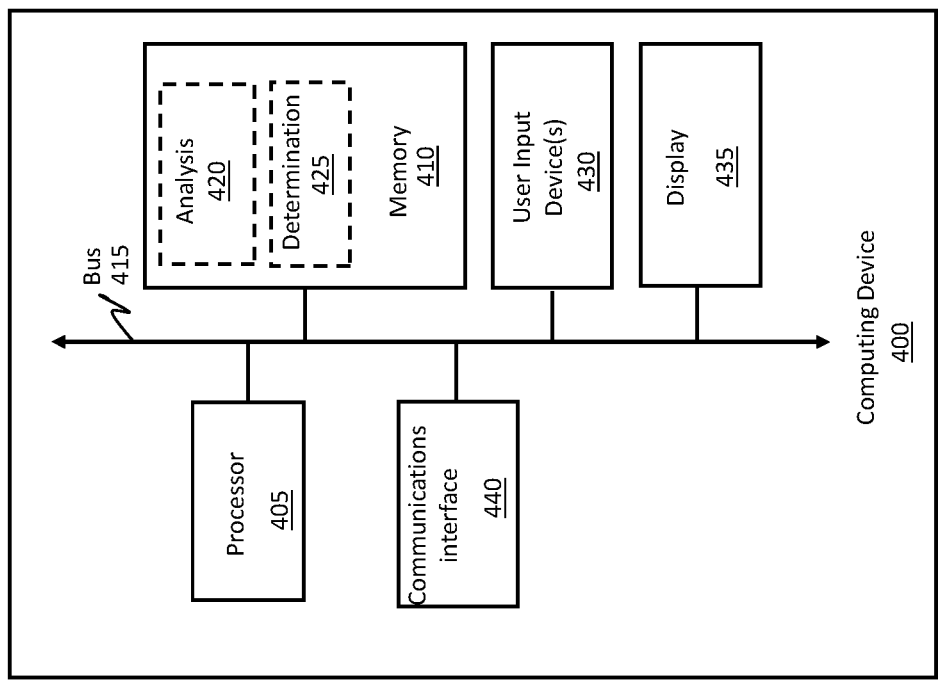
FIG. 4 shows an exemplary computing device in accordance with various embodiments of the disclosure.

FIG. 4 shows a block diagram of a analysis system (400) used for detection and/or quantification of a pathogen. As illustrated in FIG. 4, modules, engines, or components (e.g., program, code, or instructions) executable by one or more processors may be used to implement the various subsystems of an analyzer system according to various embodiments. The modules, engines, or components may be stored on a non-transitory computer medium. As needed, one or more of the modules, engines, or components may be loaded into system memory (e.g., RAM) and executed by one or more processors of the analyzer system. In the example depicted in FIG. 4, modules, engines, or components are shown for implementing the methods of the disclosure.

Thus, FIG. 4 illustrates an example computing device (400) suitable for use with systems and the methods according to this disclosure. The example computing device (400) includes a processor (405) which is in communication with the memory (410) and other components of the computing device (400) using one or more communications buses (415). The processor (405) is configured to execute processor-executable instructions stored in the memory (410) to perform one or more methods or operate one or more stations for detecting pathogen levels according to different examples, such as those in FIGS. 1-3 or disclosed elsewhere herein. In this example, the memory (410) may store processor-executable instructions (425) that can analyze (420) RT-PCR results for SARS-CoV-2 or other pathogens, as discussed herein.

The computing device 400 in this example may also include one or more user input devices (430), such as a keyboard, mouse, touchscreen, microphone, etc., to accept user input. The computing device (400) may also include a display (435) to provide visual output to a user such as a user interface. The computing device (400) may also include a communications interface (440). In some examples, the communications interface (440) may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

Detection of SARS-CoV-2

An embodiment of the disclosed SARS-CoV-2 RT-PCR test comprises a real-time reverse transcription polymerase chain reaction (rRT-PCR) test for the qualitative detection of nucleic acid from SARS-CoV-2 in upper and lower respiratory specimens (such as nasopharyngeal or oropharyngeal swabs, sputum, lower respiratory tract aspirates, bronchoalveolar lavage, and nasopharyngeal wash/aspirate or nasal aspirate) collected from individuals suspected of being infected with SARS-CoV-2.

In an embodiment, results are presented for the identification of SARS-CoV-2 RNA. SARS-CoV-2 RNA is generally detectable in respiratory specimens during the acute phase of infection. Positive results are indicative of the presence of SARS-CoV-2 RNA. In some embodiments, clinical correlation with patient history and other diagnostic information may be used to determine patient infection status. In an embodiment, positive results do not rule out bacterial infection or co-infection with other viruses. The agent detected may not be the definite cause of disease. Also, in an embodiment, negative results may not preclude SARS-CoV-2 infection and should not be used as the sole basis for patient management decisions. Negative results should be combined with clinical observations, patient history, and epidemiological information.

As disclosed herein, in some embodiments the method employs the step of heat-inactivation of the pathogen. In an embodiment, after heat inactivation of the virus, SARS-CoV-2 nucleic acid is isolated, extracted and purified from upper and lower respiratory specimens (such as nasopharyngeal or oropharyngeal swabs, sputum, lower respiratory tract aspirates, bronchoalveolar lavage, andnasopharyngeal wash/aspirate or nasal aspirate). In some embodiments, the samples are subjected to viral concentration methods and/or heat extraction of the viral nucleic acids. The purified nucleic acid can then be reverse transcribed into cDNA followed by PCR amplification and detection with the a one-step (multiplex) RT-PCR as disclosed in detail herein.

In certain embodiments, the method utilizes at least one of the following controls: Internal Control-RNase P (RP) control in clinical samples. The RP primer and probe set is included in each run to test for human RP, which controls for specimen quality and demonstrates that nucleic acid was generated by the extraction process. Or, another internal control may be used.

Positive Template Control—contains in vitro transcribed template (e.g., SARS-CoV-2) RNA with genomic regions targeted by the method. The positive control may be used to monitor for failures of rRT-PCR reagents and reaction conditions.

Negative Extraction Control (NEC)—In an embodiment, this may be a previously characterized negative patient sample. Used as an extraction control and positive control for the RP primer and probe set.

No Template (Negative) Control—Nuclease-free, molecular-grade water used to monitor non-specific amplification, cross-contamination during experimental setup, and nucleic acid contamination of reagents.

EXAMPLES

Example 1

Samples were aliquoted (e.g., into 96 well plates) and then the virus inactivated by heating at 65 degrees C. for 30 minutes in the presence of proteinase K. The CoVID-19 RT-PCR test can be used with the Roche MagNA Pure-96 (MP96) using MagNA Pure 96 DNA and Viral NA Small Volume Kit and Applied Biosystems QuantStudio7 Flex (QS7) instrument with software version 1.3. The primers and probes are those recommended by the Center for Disease Control (CDC). Tables 1 and 2 provide primers and probes and reagents that may be used. The assay was performed as a multiplex assay with all three SARS-CoV-2 primers and probes and the RP primers and probes. TaqMan® probes were labeled at 5'-end with the reporter molecule 6-carboxyfluorescein (FAM) and with the quencher, Black Hole Quencher 1 (BHQ-1) (Biosearch Technologies, Inc., Novato, CA) at 3'-end. Y=pyrimidine. In an embodiment, oligonucleotide sequences may be altered for detection of SARS-CoV-2 variants.

TABLE 1

Reagents

| Reagent | Manufacturer | Catalog # |
|---|---|---|
| DNA and Viral Small Volume Kit (3 × 192 purifications) | Roche | 06543588001 |
| TaqPath 1-Step RT-PCR Master Mix, GC (2000 reactions) | ThermoFisher | A15300 |
| COVID-19_N1-F Primer | IDT | Custom |
| COVID-19_N1-R Primer | IDT | Custom |
| COVID-19_N1-P Probe | IDT | Custom |
| COVID-19_N2-F Primer | IDT | Custom |
| COVID-19_N2-R Primer | IDT | Custom |
| COVID-19_N2-P Probe | IDT | Custom |
| COVID-19_N3-F Primer | IDT | Custom |
| COVID-19_N3-R Primer | IDT | Custom |
| COVID-19_N3-P Probe | IDT | Custom |
| RP-F Primer | IDT | Custom |
| RP-R Primer | IDT | Custom |
| RP-P Probe | IDT | Custom |
| COVID-19_N_Positive Control | IDT | Custom |
| Hs_RPP30_Internal Extraction Control | IDT | Custom |

TABLE 2

CDC COVID-19 Primers and Probes

| Name | Description | Sequence (5' → 3') | SEQ ID NO: | Label | Working Conc. |
|---|---|---|---|---|---|
| 2019-nCOV_N1-F | 2019-nCOV_N1 Forward Primer | 5'-GAC CCC AAA ATC AGC GAA AT-3' | 1 | None | 20 µM |

TABLE 2-continued

CDC COVID-19 Primers and Probes

| Name | Description | Sequence (5' → 3') | SEQ ID NO: | Label | Working Conc. |
|---|---|---|---|---|---|
| 2019-nCOV_N1-R | 2019-nCOV_N1 Reverse Primer | 5'-TCT GGT TAC TGC CAG TTG AAT CTG-3' | 2 | None | 20 µM |
| 2019-nCOV_N1-P | 2019-nCOV_N1 Probe | 5'-FAM-ACC CCG CAT TAC GTT TGG TGG ACC-BHQ1-3' | 3 | FAM, BHQ-1 | 5 µM |
| 2019-nCOV_N2-F | 2019-nCOV_N2 Forward Primer | 5'-TTA CAA ACA TTG GCC GCA AA-3' | 4 | None | 20 µM |
| 2019-nCOV_N2-R | 2019-nCOV_N2 Reverse Primer | 5'-GCG CGA CAT TCC GAA GAA-3' | 5 | None | 20 µM |
| 2019-nCOV_N2-P | 2019-nCOV_N2 Probe | 5'-FAM-ACA ATT TGC CCC CAG CGC TTC AG-BHQ1-3' | 6 | FAM, BHQ-1 | 5 µM |
| 2019-nCOV_N3-F | 2019-nCOV_N3 Forward Primer | 5'-GGG AGC CTT GAA TAC ACC AAA A-3' | 7 | None | 20 µM |
| 2019-nCOV_N3-R | 2019-nCOV_N3 Reverse Primer | 5'-TGT AGC ACG ATT GCA GCA TTG-3' | 8 | None | 20 µM |
| 2019-nCOV_N3-P | 2019-nCOV_N3 Probe | 5'-FAM-AYC ACA TTG GCA CCC GCA ATC CTG-BHQ1-3' | 9 | FAM, BHQ-1 | 5 µM |
| RP-F | RNAse P Forward Primer | 5'-AGA TTT GGA CCT GCG AGC G-3' | 10 | None | 20 µM |
| RP-R | RNAse P Reverse Primer | 5'-GAG CGG CTG TCT CCA CAA GT-3' | 11 | None | 20 µM |
| RP-P | RNAse P Probe | 5'-FAM - TTC TGA CCT GAA GGC TCT GCG CG - BHQ-1-3' | 12 | FAM, BHQ-1 | 5 µM |

Controls to be Used with the Covid-19 RT-PCR
1) A negative (no template) control is used to eliminate the possibility of sample contamination on the assay run and is used on every assay plate. This control is molecular grade, nuclease-free water.
2) A positive template (CoVID-19_N_P) control is used to verify that the assay run is performing as intended and is used on every assay plate starting at master mix addition at a concentration of 50 copies/uL. The positive control is made of in vitro transcribed and purified viral RNA target that contains one copy each of N1, N2, and N3. The positive template control does not include RNase P target and result as "undetermined" for that marker.
3) An internal (Hs_RPP30) control targeting RNase P is used to verify that nucleic acid is present in every sample and is used for every sample processed. This also serves as the extraction control to ensure that samples resulting as negative contain nucleic acid for testing.
4) A negative extraction (NEC) control is a previously characterized negative patient sample. It serves both as a negative extraction control to monitor for any cross-contamination that occurs during the extraction process, as well as an extraction control to validate extraction reagents and successful RNA extraction.

Interpretation of Results
All test controls are examined prior to interpretation of patient results. If the controls are not valid, the patient results either cannot or generally will not be interpreted.
1) CoVID-19 RT-PCR Test Controls-Positive. Negative, and Internal:
Negative (no template control)—negative for all targets detected (Ct Not Detected).
Positive (CoVID-19_N_P)—positive for all targets detected (Ct<40) Internal extraction (Hs_RPP30)-negative for SARS-CoV-2 targets (Ct Not Detected), positive for RNase P (RP) target (Ct<40).
Negative extraction (NEC)—negative for SARS-CoV-2 targets (Ct Not Detected), positive for RNase P (RP) target (Ct<40).
If any control does not perform as described above, run is considered invalid and all specimens are repeated from extraction step.
2) Examination and Interpretation of Patient Specimen Results:
RP—all clinical samples should yield positive results for RP target at <40 Ct. Samples that fail to show detection of RP and all three SARS-CoV-2 targets within this range should be repeated from extraction step. If sample detects any of the SARS-CoV-2 targets, the lack of amplification of RP target can be valid (Table 3).

TABLE 3

COVID-19 RT-PCR test results interpretation

| SARS-CoV-2 N1 | SARS-CoV-2 N2 | SARS-CoV-2 N3 | Nase P | Result Interpretation | Report | Actions |
|---|---|---|---|---|---|---|
| + | + | + | +/− | SARS-COV-2 Detected | POSITIVE | Report results to sender and appropriate public health authorities. |
| If only one or both targets are positive | | +/− | +/− | SARS-COV-2 Detected | POSITIVE | Report results to sender and appropriate health authorities. |
| − | − | + | +/− | SARS-COV-2 Presumptive Positive | PRESUMPTIVE POSITIVE | Sample is repeated once. If the repeated result remains "PRESUMPTIVE POSITIVE", additional confirmatory testing may be conducted, if it is necessary to differentiate between SARS-COV-2 and other SARS-like viruses for epidemiological purposes or clinical management. |
| − | − | − | + | SARS-COV-2 Not Detected | NEGATIVE | Report results to sender. |
| − | − | − | − | Invalid Result | INVALID | Sample is repeated once. If a second failure occurs, it is reported to sender as invalid and recommend recollection if patient is still clinically indicated. |

Performance Evaluation
1) Analytical Sensitivity:
Limit of Detection (LoD):

The LoD study established the lowest concentration of SARS-CoV-2 (genome copies (cp)/μL) that can be detected by the CoVID-19 RT-PCR test at least 95% of the time. The preliminary LoD was established by testing 10-fold dilutions of SARS-CoV-2 synthetic RNA. The preliminary LoD was confirmed by testing 20 replicates of 2-fold dilutions (50 cp/μL, 25 cp/μL, 12.5 cp/μL, 6.25 cp/μL, 3.125 cp/μL, and 1.25 cp/μL). The samples of 2-fold dilutions were prepared by spiking the quantified live SARS-CoV-2 into negative respiratory clinical matrices (NP swabs and BAL). The study results showed that the LoD of the CoVID-19 RT-PCR test is 6.25 cp/μL (19/20 positive).

2) Analytical Specificity:

Cross-reactivity of the CoVID-19 RT-PCR test was evaluated using both in silico analysis and by testing whole organisms or purified nucleic acid from a panel of organisms listed in the table below. The empirical testing showed that all targets were negative for all tested microorganisms except for the SARS coronavirus which is expected to react with N3 target (target for the universal detection of SARS-like viruses) of the CoVID-19 RT-PCR test (Table 4; ND=not detected).

TABLE 4

CROSS-REACTIVITY TEST RESULTS

| Sample Name | N1 CT | N2 CT | N3 CT | Source (Concentration) |
|---|---|---|---|---|
| Adenovirus 11 | N/D | N/D | N/D | ATCC VR-12D ($1e^{\wedge}6$) |
| Adenovirus 5 | N/D | N/D | N/D | ATCC VR-5D; Adenoid 75 ($1.5e^{\wedge}6$) |
| Bordetella pertussis | N/D | N/D | N/D | Patient Sample ($1e^{\wedge}5$) |
| Chlamydophila pneumoniae | N/D | N/D | N/D | ATCC 53592D; AR-39 ($5e^{\wedge}6$) |
| Enterovirus 70 | N/D | N/D | N/D | ATCC VR-836; J670-71 ($1e^{\wedge}6$) |
| Haemophilus influenzae | N/D | N/D | N/D | ATCC 51907D ($1e^{\wedge}6$) |
| Human coronavirus | N/D | N/D | N/D | ATCC VR-740; 229E ($1e^{\wedge}6$) |
| Human coronavirus | N/D | N/D | N/D | ATCC VR-3263SD; NL63 ($7e^{\wedge}5$) |
| Human coronavirus | N/D | N/D | N/D | ATCC VR-3262SD; HKU1 ($6e^{\wedge}5$) |
| Human coronavirus | N/D | N/D | N/D | Patient Sample; OC43 ($1e^{\wedge}5$) |

TABLE 4-continued

CROSS-REACTIVITY TEST RESULTS

| Sample Name | N1 CT | N2 CT | N3 CT | Source (Concentration) |
|---|---|---|---|---|
| Human metapneumovirus | N/D | N/D | N/D | ATCC VR-3250SD (6e^5) |
| Human parainfluenza virus 1 | N/D | N/D | N/D | ATCC VR-94D; C35 (2e^7) |
| Human parainfluenza virus 2 | N/D | N/D | N/D | ATCC VR-92D; Greer (2e^7) |
| Human parainfluenza virus 3 | N/D | N/D | N/D | ATCC VR-1782; ATCC-2011-5 |
| Human parainfluenza virus 4b | N/D | N/D | N/D | ATCC VR-1377; CH 19503 |
| Human respiratory syncytial virus | N/D | N/D | N/D | ATCC VR-1580; 18537 |
| Human rhinovirus 61 | N/D | N/D | N/D | ATCC VR-1171; 6669-CV39 |
| Influenza A | N/D | N/D | N/D | ATCC VR-1679D; H3N2, A/Hong Kong/8/68 (2e^6) |
| Influenza B | N/D | N/D | N/D | ATCC VR-1735D; B/Taiwan/2/62 (3e^6) |
| Legionella pneumophila | N/D | N/D | N/D | ATCC 33152D-5; Philadelphia-1 (1.5e^6) |
| Middle East Respiratory Syndrome coronavirus | N/D | N/D | N/D | ATCC VR-3248SD; MERS (6e^5) |
| Mycobacterium tuberculosis | N/D | N/D | N/D | ATCC 25177; H37Ra |
| Mycoplasma pneumoniae | N/D | N/D | N/D | ATCC 15531D; FH of Eaton Agent (3e^6) |
| Severe Acute Respiratory Syndrome coronavirus | N/D | N/D | 30.768 | BEI NR-3882; SARS |
| Streptococcus pneumoniae | N/D | N/D | N/D | ATCC 33400D-5 (3e^6) |
| Streptococcus pyogenes | N/D | N/D | N/D | ATCC 12344D-5; T1 (3e^6) |

BLAST analysis showed no homology with primers and probes of the CoVID-19 RT-PCR test for the organisms listed in Table 5.

TABLE 5

In silico analysis:

| Pathogen | Strain | GenBank Acc# | % Homology Test Forward Primer | % Homology Test Reverse Primer | % Homology Test Probe |
|---|---|---|---|---|---|
| Candida albicans | All | All | 0 | 0 | 0 |
| Neisseria meningitidis | All | All | 0 | 0 | 0 |
| Pseudomonas aeruginosa | All | All | 0 | 0 | 0 |
| Staphylococcus aureus | All | All | 0 | 0 | 0 |

3) Clinical Evaluation:

A contrived clinical study was performed to evaluate the performance of the CoVID-19 RT-PCR test. A total of 100 individual clinical respiratory samples, 50 NP (nasopharyngeal) swabs and 50 BALs (bronchoalveolar lavage), were used in this study. 100 negatives and 80 contrived positives were tested. Negative samples include 50 NP swabs and 50 BALs. Positive samples were comprised of 40 NP swabs and 40 BALs spiked with quantitated live SARS-CoV-2. 10 samples each were spiked at 8×, 4×, 2×, and 1×LoD. In one contrived BAL sample, prepared at LoD, N3 target was not determined. The positive and negative percent agreements between the CoVID-19 RT-PCR test and the expected results in NP swabs and BALs are shown in Tables 6 and 7.

TABLE 6

Clinical performance of the COVID-19 RT-PCR test with NP swabs

|  | SARS-COV-2 concentration | Number of NP swabs | N1 target % Positive (95% CIs) | N2 target % Positive (95% CIs) | N3 target % Positive (95% CIs) |
|---|---|---|---|---|---|
| COVID-19 RT-PCR test | 1× LoD | 10 | 100% (72.25-100) | 100% (72.25-100) | 100% (72.25-100) |
|  | 2× LoD | 10 | 100% (72.25-100) | 100% (72.25-100) | 100% (72.25-100) |
|  | 4× LoD | 10 | 100% (72.25-100) | 100% (72.25-100) | 100% (72.25-100) |
|  | 8× LoD | 10 | 100% (72.25-100) | 100% (72.25-100) | 100% (72.25-100) |
|  | Negative | 50 | 0 (NA) | 0 (NA) | 0 (NA) |

NA = Not available

Performance of the CoVID-19 RT-PCR test against the expected results are:
Positive Percent Agreement: 40/40=100% (95% CI: 91.24%-100%)
Negative Percent Agreement: 50/50=100% (95% CI: 92.87%-100%)

TABLE 7

Clinical performance of the COVID-19 RT-PCR test with BAL specimens

|  | SARS-COV-2 concentration | Number of NP swabs | N1 target % Positive (95% CIs) | N2 target % Positive (95% CIs) | N3 target % Positive (95% CIs) |
|---|---|---|---|---|---|
| COVID-19 RT-PCR test | 1× LoD | 10 | 100% (72.25-100) | 100% (72.25-100) | 90%* (59.59-98.22) |
|  | 2× LOD | 10 | 100% (72.25-100) | 100% (72.25-100) | 100% (72.25-100) |
|  | 4× LoD | 10 | 100% (72.25-100) | 100% (72.25-100) | 100% (72.25-100) |
|  | 8× LOD | 10 | 100% (72.25-100) | 100% (72.25-100) | 100% (72.25-100) |
|  | Negative | 50 | 0 (NA) | 0 (NA) | 0 (NA) |

NA = Not available
*One BAL sample had failed detection of N3 target. Since the SARS-COV-2 specific targets, N1 and N2 were detected, the overall result for this sample was "POSITIVE".

Performance of the CoVID-19 RT-PCR test against the expected results are:
Positive Percent Agreement: 40/40=100% (95% CI: 91.24%-100%)
Negative Percent Agreement: 50/50=100% (95% CI: 92.87%-100%)

Additionally, five positive and five negative patient samples were sent to the North Carolina Department of Health (NCDOH) and tested on the CDC assay under an EUA. All results were concordant (Table 8).

TABLE 8

| Sample | COVID-19 RT-PCR test | NCSLPH Result CDC assay under and EUA |
|---|---|---|
| 1 | Not detected | Not detected |
| 2 | Not detected | Not detected |
| 3 | Positive | Presumptive Positive |
| 4 | Not detected | Not detected |
| 5 | Positive | Presumptive Positive |
| 6 | Positive | Presumptive Positive |
| 7 | Not detected | Not detected |
| 8 | Positive | Presumptive Positive |
| 9 | Not detected | Not detected |
| 10 | Positive | Presumptive Positive |

Example 2

In certain embodiments, the method may be performed by concentrating the viral particles followed by subsequent extraction of the viral RNA from the viral particles. Once the RNA is extracted, amplification may be performed using the primers and methods detailed in Example 1.

Briefly, samples (nasal swab) are received and a portion aliquoted into individual wells in a plate (e.g., 96 well microtiter plate). After inactivation of viral proteins by treatment with proteinase K and heating at 65 degrees C. for 30 minutes (as performed in Example 1), the samples are subjected to concentration (e.g., purification) of the virus using a matrix designed to bind viral particles (e.g., Nanotrap® Virus Capture Kit, Ceres Nanosciences, Inc.). Briefly, the heat-inactivated viral particles are mixed with the virus capture beads (e.g. Nanotrap®) as recommended by the manufacturer. The beads may then be magnetically concentrated, media removed and the beads washed in phosphate-buffered saline (PBS). After magnetic concentration, elution buffer is added and the viral particles attached to the bead are then incubated at 95 degrees C. for the required time (e.g., 5 min) in the elution buffer. The beads are then magnetically concentrated and the viral RNA is removed and transferred to another plate for RT-PCR as described in Example 1. The process may be automated using a Hamilton robot. Use of heated extraction of the virus allows for processing of 400 samples to be completed in 40 minutes as compared to 4 hours using the purification described in Example 1.

Example 3—Embodiments

Various non-limiting embodiments are provided below.
A1. A method to detect SARS-CoV-2 in a sample from a subject comprising:
obtaining a sample from the subject;
isolating SARS-CoV-2 RNA from the sample;
generating copy DNA (cDNA) from the SARS-CoV-2 RNA;
amplifying at least one target sequence of the SARS-CoV-2 cDNA; and detecting the amplified SARS-CoV-2 sequences.
A2. The method of any one of the previous or subsequent method embodiments, wherein the sample is treated to inactivate the virus.
A3. The method of any one of the previous or subsequent method embodiments, wherein the sample is heated to inactivate the virus
A4. The method of any one of the previous or subsequent method embodiments, wherein the sample is heated to at least 60 degrees C., or to at least 65 degrees C., or to at least 70 degrees C., or to at least 75 degrees C. for a designated time.
A4.1 The method of any one of the previous or subsequent method embodiments, wherein the sample is heated for at least 10 minutes, or at least 20 minutes, or at least 30 minutes, or at least 40 minutes, or at least 50 minutes or for 1 hour or more.
A4.2 The method of any one of the previous or subsequent method embodiments, wherein the sample is heated at 65 degrees C. for about 30 minutes to inactivate the virus.
A5. The method of any one of the previous or subsequent method embodiments, wherein the sample is treated with a protease to inactivate the virus.
A6. The method of any one of the previous or subsequent method embodiments, wherein the sample is treated with a proteinase K.
A7. The method of any one of the previous or subsequent method embodiments, wherein the step of isolating SARS-CoV-2 RNA comprises concentrating viral particles followed by elution of the SARS-CoV-2 RNA from the concentrated viral particles.
A8. The method of any one of the previous or subsequent method embodiments, wherein the elution of viral RNA from the concentrated viral particles is performed at 95 degrees C. for at least 5 minutes.
A9. The method of any one of the previous or subsequent method embodiments, wherein the step of amplifying at least one target sequence of the SARS-CoV-2 comprises quantitative RT-PCR.
A10. The method of any one of the previous or subsequent method embodiments, wherein the at least one target sequence of SARS-CoV-2 comprises at least part of the SARS-CoV-2 nucleocapsid (N) gene.
A11. The method of any one of the previous or subsequent method embodiments, wherein the at least one target sequence of SARS-CoV-2 comprises the SARS-CoV-2 N1, N2 and N3 sequences.
A12. The method of any one of the previous or subsequent method embodiments, wherein the step of amplifying at least one target sequence of SARS-CoV-2 comprises multiplex RT-PCR using primers and probes for SARS-CoV-2 N1, N2 and N3 sequences.
A13. The method of any one of the previous or subsequent method embodiments, wherein the step of amplifying at least one specific target sequence of the SARS-CoV-2 cDNA comprises hybridizing a probe to the at least one specific target sequence, such that during the extension phase of amplification, a 5' nuclease activity of Taq polymerase degrades the bound probe, causing a reporter dye on the probe to separate from a quencher dye on the probe, generating a fluorescent signal.
A14. The method of any one of the previous or subsequent method embodiments, wherein the reporter dye is FAM.
A15. The method of any one of the previous or subsequent method embodiments, wherein the quencher dye is BHQ1.
A16. The method of any one of the previous or subsequent method embodiments, wherein the step of amplifying further comprises amplification of a nucleic acid sequence from a control gene that is present in the subject, but not the virus.
A17. The method of any one of the previous or subsequent method embodiments, wherein the control gene is the human RNase P (RP) gene.
A18. The method of any one of the previous or subsequent method embodiments, wherein the step of amplifying at least one target sequence of SARS-CoV-2 comprises the use of at least one primer and/or probe having the sequence of any one of SEQ ID NOs: 1-9.
A19. The method of any one of the previous or subsequent method embodiments, wherein the step of amplifying a nucleic acid sequence from the RP gene comprises the use of at least one primer and/or probe having the sequence of any one of SEQ ID NOs: 10-12.
A20. The method of any one of the previous or subsequent method embodiments, wherein the sample comprises a specimen from either the upper or lower respiratory system.
A21. The method of any one of the previous or subsequent method embodiments, wherein the sample comprises at least one of a nasopharyngeal swab, an oropharyngeal swab, sputum, a lower respiratory tract aspirate, a bronchoalveolar lavage, a nasopharyngeal wash or aspirate, or a nasal aspirate.
B1. A method to detect the presence or absence of a pathogen in a sample from a subject comprising:
obtaining a sample from the subject;
treating the sample to inactivate any pathogen present in the sample;
optionally, treating the sample to concentrate any pathogen present in the sample;
treating the inactivated and optionally concentrated sample to isolate a pathogen-specific nucleic acid from the sample; and
detecting the presence or absence of the isolated pathogen-specific nucleic acid.
B2. The method of any one of the previous or subsequent method embodiments, further comprising:
isolating RNA from the inactivated sample;
generating copy DNA (cDNA) from the RNA isolated from the inactivated sample;
amplifying at least one specific target sequence of the cDNA; and
detecting presence or absence of amplified sequences.
B3. The method of any one of the previous or subsequent method embodiments, wherein the pathogen is SARS-CoV-2.
B4. The method of any one of the previous or subsequent method embodiments, wherein the sample is heated to inactivate the pathogen.

B5. The method of any one of the previous or subsequent method embodiments, wherein the sample is heated to at least 60 degrees C., or to at least 65 degrees C., or to at least 70 degrees C., or to at least 75 degrees C. for a designated time.

B5.1 The method of any one of the previous or subsequent method embodiments, wherein the sample is heated for at least 10 minutes, or at least 20 minutes, or at least 30 minutes, or at least 40 minutes, or at least 50 minutes or for 1 hour or more.

B5.2 The method of any one of the previous or subsequent method embodiments, wherein the sample is heated at 65 degrees C. for about 30 minutes to inactivate the pathogen.

B6. The method of any one of the previous or subsequent method embodiments, wherein the sample is treated with a protease to inactivate the pathogen.

B7. The method of any one of the previous or subsequent method embodiments, wherein the sample is treated with a proteinase K.

B8. The method of any one of the previous or subsequent method embodiments, wherein the step of isolating pathogen nucleic acid comprises concentrating the inactivated pathogen followed by elution of the pathogen nucleic acid.

B9. The method of any one of the previous or subsequent method embodiments, wherein the elution of pathogen nucleic acid from the concentrated pathogen is performed at 95 degrees C. for at least 5 minutes.

B10. The method of any one of the previous or subsequent method embodiments, wherein the step of amplifying at least one target sequence of the pathogen nucleic acid comprises quantitative PCR.

B11. The method of any one of the previous or subsequent method embodiments, wherein the at least one target sequence of SARS-CoV-2 comprises at least part of the SARS-CoV-2 nucleocapsid (N) gene.

B12. The method of any one of the previous or subsequent method embodiments, wherein the at least one target sequence of SARS-CoV-2 comprises SARS-CoV-2 N1, N2 and N3 sequences.

B13. The method of any one of the previous or subsequent method embodiments, wherein the step of amplifying at least one target sequence of the pathogen comprises multiplex RT-PCR using primers and probes for a pathogen target sequence or sequences.

B14. The method of any one of the previous or subsequent method embodiments, wherein the step of amplifying at least one target sequence of the pathogen comprises hybridizing a probe to the at least one pathogen target sequence such that during the extension phase of amplification, a 5' nuclease activity of Taq polymerase degrades the bound probe, causing a reporter dye on the probe to separate from a quencher dye on the probe, generating a fluorescent signal.

B15. The method of any one of the previous or subsequent method embodiments, wherein the reporter dye is FAM.

B16. The method of any one of the previous or subsequent method embodiments, wherein the quencher dye is BHQ1.

B17. The method of any one of the previous or subsequent method embodiments, wherein the step of amplifying further comprises amplification of a nucleic acid sequence from a control gene that is present in the subject, but not the virus.

B18. The method of any one of the previous or subsequent method embodiments, wherein the control gene is the human RNase P (RP) gene.

B19. The method of any one of the previous or subsequent method embodiments, wherein the step of amplifying at least one target sequence of SARS-CoV-2 comprises the use of at least one primer and/or probe having the sequence of any one of SEQ ID NOs: 1-9.

B20. The method of any one of the previous or subsequent method embodiments, wherein the step of amplifying a nucleic acid sequence from the RP gene comprises the use of at least one primer and/or probe having the sequence of any one of SEQ ID NOs: 10-12.

B21. The method of any one of the previous or subsequent method embodiments, wherein the sample comprises a specimen from either the upper or lower respiratory system.

B22. The method of any one of the previous or subsequent method embodiments, wherein the sample comprises at least one of a nasopharyngeal swab, an oropharyngeal swab, sputum, a lower respiratory tract aspirate, a bronchoalveolar lavage, a nasopharyngeal wash or aspirate, or a nasal aspirate.

C1. A system for performing a step or any of the steps of the previous embodiments or for using any of the compositions and/or kits of the subsequent kit or composition embodiments.

C2. A system to detect the presence or absence of a pathogen in a sample from a subject comprising: at least one station to inactivate the pathogen and a station to detect the presence or absence of the pathogen-specific nucleic acid.

C3. The system of any of the previous or subsequent system embodiments comprising a station to receive or obtain a sample from a subject.

C4. The system of any of the previous or subsequent system embodiments comprising a station to purify or partially purify the pathogen from a sample from a subject.

C5. The system of any of the previous or subsequent system embodiments comprising a station to isolate nucleic acid from the pathogen.

C6. The system of any of the previous or subsequent system embodiments comprising a station to report results.

C7. The system of any of the previous or subsequent system embodiments, wherein the pathogen is SARS-CoV-2.

C8. The system of any of the previous or subsequent system embodiments, wherein the sample is heated to inactivate the pathogen.

C9. The system of any one of the previous or subsequent system embodiments, wherein the sample is heated to at least 60 degrees C., or to at least 65 degrees C., or to at least 70 degrees C., or to at least 75 degrees C. for a designated time.

C9.1 The system of any of the previous or subsequent system embodiments, wherein the sample is heated for at least 10 minutes, or at least 20 minutes, or at least 30 minutes, or at least 40 minutes, or at least 50 minutes or for 1 hour or more.

C9.2 The system of any of the previous or subsequent system embodiments, wherein the sample is heated at 65 degrees C. for about 30 minutes to inactivate the pathogen.

C10. The system of any of the previous or subsequent system embodiments, wherein the sample is treated with a protease to inactivate the pathogen.

C11. The system of any of the previous or subsequent system embodiments, wherein the sample is treated with a proteinase K.

C12. The system of any of the previous or subsequent system embodiments, wherein the step of isolating pathogen nucleic acid comprises concentrating the inactivated pathogen followed by elution of the pathogen nucleic acid.

C13. The system of any of the previous or subsequent system embodiments, wherein the elution of pathogen nucleic acid from the concentrated pathogen is performed at 95 degrees C. for at least 5 minutes.

C14. The system of any of the previous or subsequent system embodiments, wherein the step of amplifying at least one target sequence of the pathogen nucleic acid comprises quantitative PCR.

C15. The system of any of the previous or subsequent system embodiments, wherein the at least one target sequence of SARS-CoV-2 comprises at least part of the SARS-CoV-2 nucleocapsid (N) gene.

C16. The system of any of the previous or subsequent system embodiments, wherein the at least one target sequence of SARS-CoV-2 comprises SARS-CoV-2 N1, N2 and N3 sequences.

C17. The system of any of the previous or subsequent system embodiments, wherein the step of amplifying at least one target sequence of the pathogen comprises multiplex RT-PCR using primers and probes for a pathogen target sequence or sequences.

C18. The system of any of the previous or subsequent system embodiments, wherein the step of amplifying at least one target sequence of the pathogen comprises hybridizing a probe to the at least one pathogen target sequence such that during the extension phase of amplification, a 5' nuclease activity of Taq polymerase degrades the bound probe, causing a reporter dye on the probe to separate from a quencher dye on the probe, generating a fluorescent signal.

C19. The system of any of the previous or subsequent system embodiments, wherein the reporter dye is FAM.

C20. The system of any of the previous or subsequent system embodiments wherein the quencher dye is BHQ1.

C21. The system of any of the previous or subsequent system embodiments, wherein the step of amplifying further comprises amplification of a nucleic acid sequence from a control gene that is present in the subject, but not the virus.

C22. The system of any of the previous or subsequent system embodiments, wherein the control gene is the human RNase P (RP) gene.

C23. The system of any of the previous or subsequent system embodiments, wherein the step of amplifying at least one target sequence of SARS-CoV-2 comprises the use of at least one primer and/or probe having the sequence of any one of SEQ ID NOs: 1-9.

C24. The system of any of the previous or subsequent system embodiments, wherein the step of amplifying a nucleic acid sequence from the RP gene comprises the use of at least one primer and/or probe having the sequence of any one of SEQ ID NOs: 10-12.

C25. The system of any of the previous or subsequent system embodiments wherein the sample comprises a specimen from either the upper or lower respiratory system.

C26. The system of any of the previous or subsequent system embodiments, wherein the sample comprises at least one of a nasopharyngeal swab, an oropharyngeal swab, sputum, a lower respiratory tract aspirate, a bronchoalveolar lavage, a nasopharyngeal wash or aspirate, or a nasal aspirate.

C27. The system of any of the previous or subsequent system embodiments, wherein at least one station is automated and/or controlled by a computer.

D1. A computer-program product tangibly embodied in a non-transitory machine-readable storage medium, including instructions configured to perform any step of the methods or run any of the stations of the systems of the previous embodiments.

D2. A computer-program product tangibly embodied in a non-transitory machine-readable storage medium, including instructions configured to detect the presence or absence of a pathogen-specific nucleic acid.

D3. A computer-program product tangibly embodied in a non-transitory machine-readable storage medium of any of the previous or subsequent embodiments, including instructions configured to detect the presence or absence of SARS-CoV-2 nucleic acid.

E1. A composition comprising reagents to perform any of the methods of the previous embodiments.

E2. The composition of any of the previous or subsequent composition embodiments comprising reagents detect the presence or absence of SARS-CoV-2.

E3. The composition of any of the previous or subsequent composition embodiments, comprising at least one primer and/or probe having the sequence of any one of SEQ ID NOs: 1-9.

E4. The composition of any of the previous or subsequent composition embodiments, comprising at least one primer and/or probe having the sequence of any one of SEQ ID NOs: 10-12.

E5. The composition of any of the previous or subsequent composition embodiments, comprising reagents for obtaining a sample from a subject.

E6. The composition of any of the previous or subsequent composition embodiments, comprising a protease for inactivating the pathogen.

E7. The composition of any of the previous or subsequent composition embodiments, comprising reagents to purify or partially purify the pathogen from other components in the sample.

E8. The composition of any of the previous or subsequent composition embodiments, comprising reagents for detecting the pathogen.

E9. The composition of any of the previous or subsequent composition embodiments, comprising reagents for generating cDNA from RNA.

E10. The composition of any of the previous or subsequent composition embodiments, comprising reagents for quantitative PCR.

E11. The composition of any of the previous or subsequent composition embodiments, wherein probes for quantitative PCR are labeled with a reporter dye and a quencher dye.

E12. The composition of any of the previous or subsequent composition embodiments, wherein the probes for quantitative PCR are labeled with FAM and/or BHQ1.

E13. The composition of any of the previous or subsequent composition embodiments, comprising instructions for use of any of the reagents.

E14. The composition of any of the previous or subsequent composition embodiments, wherein the reagents or components thereof are packaged in individual containers.

F1 A kit comprising reagents to perform any of the methods of the previous embodiments.

F2. The kit of any of the previous or subsequent kit embodiments, comprising reagents detect the presence or absence of SARS-CoV-2.

F3. The kit of any of the previous or subsequent kit embodiments, comprising at least one primer and/or probe having the sequence of any one of SEQ ID NOs: 1-9.

F4. The kit of any of the previous or subsequent kit embodiments, comprising at least one primer and/or probe having the sequence of any one of SEQ ID NOs: 10-12.

F5. The kit of any of the previous or subsequent kit embodiments, comprising reagents or components for obtaining a sample from a subject.

F6. The kit of any of the previous or subsequent kit embodiments, comprising a protease for inactivating the pathogen.

F7. The kit of any of the previous or subsequent kit embodiments, comprising reagents to purify or partially purify the pathogen from other components in the sample.

F8. The kit of any of the previous or subsequent kit embodiments, comprising reagents for detecting the pathogen.

F9. The kit of any of the previous or subsequent kit embodiments, comprising reagents for generating cDNA from RNA.

F10. The kit of any of the previous or subsequent kit embodiments, comprising reagents for quantitative PCR.

F11. The kit of any of the previous or subsequent kit embodiments, wherein probes for quantitative PCR are labeled with a reporter dye and a quencher dye.

F12. The kit of any of the previous or subsequent kit embodiments, wherein the probes for quantitative PCR are labeled with FAM and/or BHQ1.

F13. The kit of any of the previous or subsequent kit embodiments, comprising instructions for use of any of the reagents.

F14. The kit of any of the previous or subsequent kit embodiments, wherein the reagents or components thereof are packaged in individual containers.

Additional Considerations

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

That which is claimed is:

1. A method to detect SARS-CoV-2 in a sample from a subject comprising:
   obtaining a sample from the subject;
   treating the sample to inactivate the virus, wherein the sample is heated at 65 degrees C. for about 30 minutes to inactivate the virus;
   isolating SARS-CoV-2 RNA from the treated sample, wherein isolating SARS-CoV-2 RNA comprises concentrating viral particles followed by elution of the SARS-CoV-2 RNA from the concentrated viral particles, and wherein elution of the SARS-CoV-2 RNA from the concentrated viral particles is performed at 95 degrees C. for at least 5 minutes;
   generating copy DNA (cDNA) from the SARS-CoV-2 RNA;
   amplifying at least one target sequence of the SARS-CoV-2 cDNA; and
   detecting the at least one amplified SARS-CoV-2 sequence.

2. The method of claim 1, wherein the sample is treated with a protease to inactivate the virus.

3. The method of claim 1, wherein the step of amplifying at least one target sequence of the SARS-CoV-2 cDNA comprises quantitative PCR.

4. The method of claim 1, wherein the at least one target sequence of the SARS-CoV-2 cDNA comprises at least part of the SARS-CoV-2 nucleocapsid (N) gene.

5. The method of claim 1, wherein the step of amplifying further comprises amplification of a nucleic acid from a control gene that is present in the subject, but not the virus.

6. The method of claim 5, wherein the control gene is the human RNase P (RP) gene.

7. The method of claim 1, wherein the sample comprises a specimen from either the upper or lower respiratory system.

8. The method of claim 7, wherein the sample comprises at least one of a nasopharyngeal swab, an oropharyngeal swab, sputum, a lower respiratory tract aspirate, a bronchoalveolar lavage, a nasopharyngeal wash or aspirate, or a nasal aspirate.

9. The method of claim 1, wherein the step of amplifying the at least one target sequence of the SARS-CoV-2 cDNA comprises hybridizing a probe to the at least one target sequence such that during the extension phase of amplification, a 5' nuclease activity of Taq polymerase degrades the bound probe, causing a reporter dye on the probe to separate from a quencher dye on the probe, generating a fluorescent signal.

10. The method of claim 9, wherein the reporter dye is FAM.

11. The method of claim 9, wherein the quencher dye is BHQ1.

12. The method of claim 1, wherein the step of amplifying the at least one target sequence of the SARS-CoV-2 cDNA comprises multiplex RT-PCR using primers and probes for SARS-CoV-2 N1, N2 and N3 sequences.

13. The method of claim 1, wherein the step of amplifying at least one target sequence of the SARS-CoV-2 cDNA comprises the use of at least one primer and/or probe having the sequence of any one of SEQ ID NOs: 1-9.

14. A method to detect the presence or absence of SARS-CoV-2 in a sample from a subject comprising:
   obtaining a sample from the subject;
   treating the sample to inactivate the SARS-CoV-2 present in the sample, wherein the sample is heated at 65 degrees C. for about 30 minutes to inactivate the SARS-CoV-2;
   treating the sample to concentrate the SARS-CoV-2 present in the sample;
   isolating a SARS-CoV-2-specific RNA from the inactivated and concentrated sample, wherein isolating the SARS-CoV-2-specific RNA comprises concentrating viral particles followed by elution of the SARS-CoV-2-specific RNA from the concentrated viral particles, and wherein elution of the SARS-CoV-2-specific RNA from the concentrated viral particles is performed at 95 degrees C. for at least 5 minutes; and
   detecting the presence or absence of the isolated SARS-CoV-2-specific RNA.

15. The method of claim 14, further comprising:
   generating copy DNA (cDNA) from the SARS-CoV-2-specific RNA isolated from the inactivated sample;
   amplifying at least one specific target sequence of the cDNA; and
   detecting presence or absence of amplified sequences.

16. The method of claim 14, wherein the sample is treated with a protease to inactivate the SARS-CoV-2.

* * * * *